United States Patent [19]

Ogiso et al.

[11] 3,804,497

[45] Apr. 16, 1974

[54] SYSTEM FOR SIMULTANEOUS RECORDING WITH A CAMERA AND SYSTEM FOR SYNCHRONIZED REPRODUCTION

[75] Inventors: Mitsutoshi Ogiso, Kawasaki; Kiyoshi Takahashi, Tokyo; Hiroshi Furukawa, Tokyo; Takashi Itani, Tokyo, all of Japan

[73] Assignee: Canon Kabushiki Kaisha, Tokyo, Japan

[22] Filed: Sept. 14, 1972

[21] Appl. No.: 289,166

[30] Foreign Application Priority Data

Sept. 14, 1971 Japan .............................. 46-71428

[52] U.S. Cl. .......................... 352/17, 352/5, 352/22

[51] Int. Cl. .......................................... G03b 31/04

[58] Field of Search .............. 352/5, 6, 7, 9, 12, 15, 352/16, 17, 22

[56] References Cited

UNITED STATES PATENTS

| | | | |
|---|---|---|---|
| 3,620,609 | 11/1971 | John | 352/17 |
| 3,475,088 | 10/1969 | Saua | 352/9 X |
| 3,675,994 | 7/1972 | Badalich et al. | 352/17 X |

*Primary Examiner*—Samuel S. Matthews
*Assistant Examiner*—Michael L. Gellner
*Attorney, Agent, or Firm*—Toren and McGeady

[57] ABSTRACT

In a magnetic tape for recording a sound sequence in relation to an image sequence to be recorded on a film, a control signal sequence which corresponds to each constitutional part of said image sequence in a film is recorded. A tape recorder is used for recording sound information which is quite independent of said sound sequence, to effect after-recording of sound which corresponds to the image on the film. Other control signals entirely different from said control signal sequence, for moving the film and a tape synchronously, are recorded through the tape recorder simultaneously with the after-recording. In such manner, a sound signal formed by simultaneous recording with a camera and a sound signal formed by after-recording on one roll of a film are selectively and synchronously reproduced.

11 Claims, 22 Drawing Figures

SYSTEM FOR SIMULTANEOUS RECORDING WITH A CAMERA AND SYSTEM FOR SYNCHRONIZED REPRODUCTION

BACKGROUND OF INVENTION

1. Field of Invention

The present invention relates to an improved system for synchronized film with sound as well as for reproducing a film and a tape synchronously with each other after photographing and after the sound is recorded.

2. Description of prior art

Various kinds of systems for simultaneous sound recording with a camera and simultaneous reproducing, which have hitherto been proposed and which have been assembled with a compact camera, a tape recorder and a projector, attempt to photograph some scene with a cinecamera and simultaneously record the sound of said scene through a tape recorder. The film and the tape in which image and the sound are combined with each other are synchronously reproduced as they are by means of a projector and a tape recorder. If this kind of the film in the system for simultaneous recording with a camera is subject to some editing after filming, the sound tape simultaneously recorded with a camera becomes useless. Moreover, although said film is subject to editing, both of the film and the tape must be edited, thus causing serious difficulty. Such sort of difficulty derives chiefly from necessity of the control in which, on one hand, photographing has to be taken by a compact camera while, on the other hand, sound recording has to be performed through a tape recorder of a separate unit from said camera. Even after editing is carried out while overcoming the foregoing difficulty, considerable skill is required in technique to reproduce image and sound of the scene synchronously in extremely natural state.

A typical example of hitherto known systems for simultaneous sound recording with a camera will be described hereinafter.

U.S. Pat. No. 3,539,248 discloses a simultaneous sound recording system having a camera, a tape recorder and a projector, and is provided with photoelectric means for moving a film and a tape synchronously to record on the tape simultaneously with a camera and to use said sound tape simultaneously recorded with a camera as it is. In other words, it is provided with photoelectric means for synchronized reproducing of sound through a tape recorder synchronizing with reproducing of image through a projector. However, the disclosure of the aforementioned U.S. Patent does not disclose a synchronized reproducing system useful for operation after some editing has been compiled.

On the other hand, French Pat. No. 2,066,649 discloses the construction of a tape recorder in which a drive mechanism for a tape recorder having both a big load at the starting stage and a big inertia at the halting stage is improved in order to minimize the time difference between drive for a camera and drive for a tape recorder at the time of simultaneous recording with a camera so as to follow the starting and the halting actions of a camera in extreme accuracy. The object of the French Patent is to improve synchronism of simultaneous sound recording with a camera to the utmost. However there is no description on the problems relative to editing for the sound recorded tape and the after-recording.

While, at present, developments for audio-visual machines such as a compact cinecamera and a tape recorder in high accuracy or the like have been extensively made and demands therefor in the market have remarkably been increasing, and in particular, it has eagerly there has been a desire to produce cinematic film to one's own preference using a compact cinecamera of 8mm film and a tape recorder by simultaneous recording with a camera in addition to editing thereof, but conventional systems such as mentioned above were found to have difficulties in synchronized reproducing after editing.

SUMMARY OF INVENTION

The object of the present invention is to provide an improved system which overcomes the foregoing defects and difficulties of hitherto known systems and, in particular, to provide a novel system in which optional editing such as after-recording or the like can be performed on a film which is recorded with the sound therein simultaneously with a camera and in which synchronized reproducing with a film can easily be carried out. In other words, it is an object of the present invention to provide a system for recording reproduced information of sound medium recorded thereon with sound sequence relative to each sequence of a film as well as for recording another independent sound information in the course of recording image sequence on a film and also reproducing a film recorded thereon with a start mark at the beginning of each image sequence.

In order to fulfil the above-mentioned objects, the system according to the present invention is constituted in such a mechanism that sound medium for recording sound sequence relative to image sequence has been recorded with a control signal sequence corresponding to each constitutional part in image sequence together with sound sequence. A recording apparatus for recording sound information which is independent of sound sequence and a reproducing apparatus for reproducing said image sequence are actuated to start synchronously with a independent control signal which is quite different from said control signal sequence. Due to the sound information recorded in said recording apparatus together with the start mark on the film being detected, said control signal sequence is applied thereto. Thus both of said apparatus are actuated again to be driven by means of said control signal sequence so that said sound sequence is recorded through said recording apparatus.

The other objects and features of the present invention will now clearly be understood through the following descriptions made in reference to the accompanying drawings by way of example of the invention.

DESCRIPTION OF PREFERRED EMBODIMENTS

Figure 1:
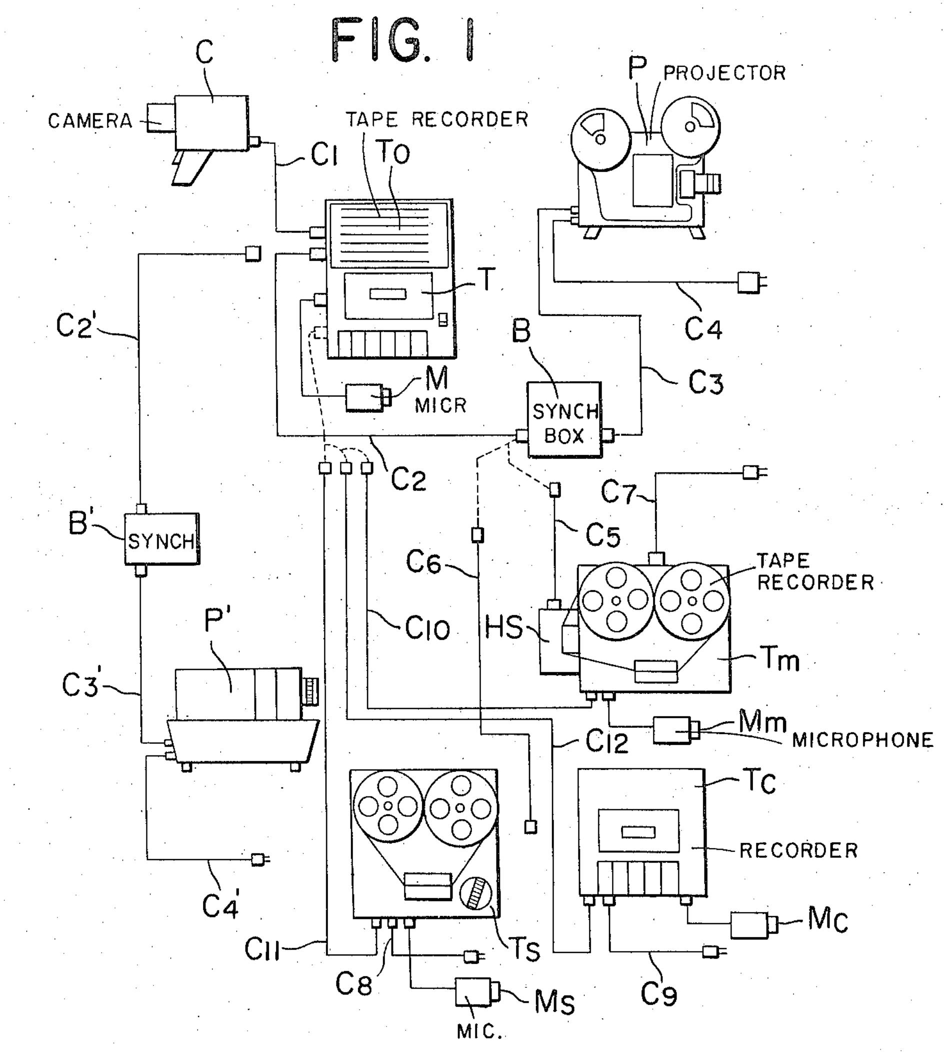
FIG. 1 is a schematic diagram of the system according to the present invention showing the whole structure thereof.

According to the present invention, the start mark of at least the initial scene among the scenes edited, as occasion demands, is recorded on the film at the time of photographing or after photographing in order to obtain further certainty in synchronization of projected scenes with sound signal to be reproduced through combination in response to the necessity for synchronized control in each case as hereinbefore set forth, thus a tape feeding apparatus is instantaneously started, subsequently the tape feeding apparatus can be halted instantaneously as occasion arises due to the end mark of each scene recorded on the tape or the end mark of each scene recorded on the film at the time of photographing or recorded thereon after photographing is made.

According to the mechanism hitherto been proposed, it has been required in the aforementioned case, to actuate a projector to feed a film continuously and halt the tape feeding motion of a tape recorder between two adjacent scenes so as to prevent the outbreak of unsynchronized accumulated errors of the projected scenes with reproduced sound.

However, in the present invention, it is necessitated that various considerations are given to the system at the time of sound recording operation in order to get rid of the outbreak of the foregoing unsynchronized accumulated errors, so as to obtain simultaneous recording with a camera and synchronized recording through simple operation which will hereinafter be described.

Now, the operation of the starting and the halting for projection with sound will be explained as follows:

In the first place, a projector is actuated to start by means of a starting switch of the system for projection with sound and the tape feeding motion is commenced at the start mark of the initial scene. When the projected scenes in synchronization come near to the end, the tape feeding motion is halted instantaneously at the stop mark recorded on the film or the tape. After instantaneous halt of said tape feeding motion, said motion is started again at the subsequent start mark recorded on the film of the next scene. The aforementioned stages of motion are repeated until the tape comes to the stop mark of the last scene where the tape feeding motion is halted instantaneously, thus the system which was driven to start by the starting switch of said projection with sound system is set back to the initial pre-starting condition or to the reel back condition by means of a film end signal provided near the last scene or at the film end portion. Of course, after the projection being completely finished, said system may be reset to the pre-starting condition by actuating said starting switch manually.

However, in this instance as mentioned above, the tape feeding motion is driven by switching to "ON" or "OFF" position, so that it may be better to set these positions under unworkable condition. In case of the projection with sound performed only by simultaneous recording with a camera as hereinafter described, the tape feeding motion is set to be continuously in motion during projection.

The present invention will be understood in connection with the system for synchronous sound recording with a camera, for synchronous reproducing, or for synchronous sound remixing. Meanwhile, the present invention may be understood to be classified as follows:

*a*. In case, simultaneous recording with a camera is conducted by means of a tape feeding apparatus provided with or without an instantaneous starting means and/or an instantaneous halting means for reproducing during projection,

*a'*. In case, simultaneous recording with a camera is only performed by means of the above-mentioned tape feeding apparatus for reproducing the sound which is recorded with insertion of after-recording available for dabbing and mixing during projection by means of said tape feeding apparatus, or different tape feeding apparatus of another tape recorder,

*b*. Only after-recording is performed which is to be reproduced during projection,

*c*. In case, film editing is conducted by an intermittent simultaneous recording with a camera, then after-recording available for dabbing and mixing is made to take place for reproducing the sound during projection or editing is performed for the sound recorded by the foregoing process for carrying out after-recording. In other way, consideration is made for the possibility of application to the projection with slide.

The constitution of the system for sound recording and reproducing in the above-described cases (*a*) and (*c*) respectively will now be explained in detail with reference to the diagrams of electric circuits shown in a form of an embodiment, subsequently the constitution of each principal part and the essential part of function will be elucidated in detail with reference to the connecting diagram and the block diagram.

In the sound recording and reproducing system according to the present invention, as shown in FIG. 1, the alphabetical symbol G designates a camera, P denotes a projector, To is a tape recorder with an instantaneous starting and instantaneous halting action. Reference character B indicates a synchro box which will be explained hereinafter, Tm represents a monoral tape recorder, Ts is a stereo tape recorder, Tc is a cassette tape recorder, P' is a slide projector, B' is a control box. There are provided several cords $C_1$, $C_2$ and $C_3$ between constitutional elements such as, for instance, at the most five-core cord $C_1$ between the camera C and the tape recorder To, at the most five-core cord $C_2$ between the tape recorder To and a synchro box B, and at the most six-core cord $C_3$ between the synchro box B and the projector P respectively. $C_4$ is a cord for power source of the projector P. $C_2'$, $C_3'$ and $C_4'$ respectively are connecting cords for controlling the slide to set or reset to the position in the projection operation by means of pulse through the control box B' and each of these cords corresponds to said cords $C_2$, $C_3$ and $C_4$ respectively. In the foregoing constitution, slide projection with sound is able to be performed. $C_5$ is at the most five-core cord for connecting the monoral tape recorder Tm with synchro box B. Hs is a synchro head attachable to said tape recorder Tm, and function thereof will be explained hereinafter. $C_6$ is a compound connecting cord composed of two-core cords for stereo to connect the synchro box B with the tape recorder Ts or Tc. $C_7$, $C_8$ and $C_9$ respectively are power sources of corresponding tape recorders Tm, Ts and Tc. M is a microphone for simultaneous recording with a camera, which is applicable to stereo and may be provided with a long cord in case of necessity or may be accommodated within the tape recorder To. Moreover, $C_{10}$, $C_{11}$ and $C_{12}$ respectively are cords for audio-visual machines to be provided between the tape recorders To and Tm, between the tape recorders To and Ts, and between the tape recorders To and Tc. Mm, Mc and Ms respectively are microphones for corresponding tape recorders Tm, Tc and Ts.

The outline of the operation of photographing in simultaneous recording with a camera by connecting the camera C and the tape recorder To through the cord $C_1$ will now be explained hereinafter with reference to FIG. 2 by way of an example illustrating the console portion of the tape recorder To shown in the front view.

Figure 2:
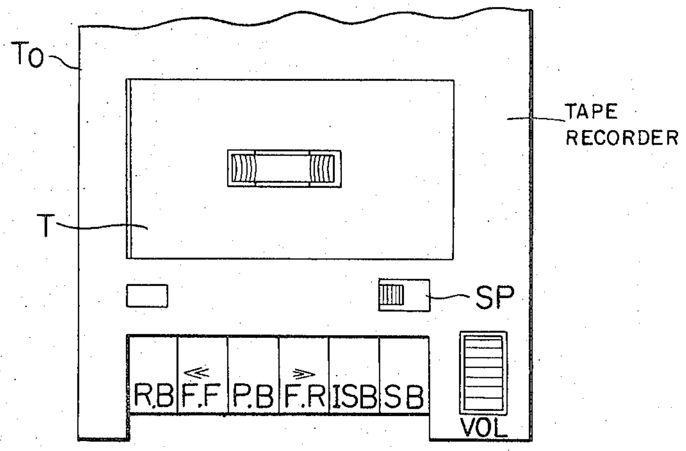
FIG. 2 is a front view of a tape recorder shown in FIG. 1 illustrating the console portion thereof, FIGS. 3 and 4 respectively are schematic diagrams of the system according to the present invention showing in a form of the other embodiment.
Figure 3:
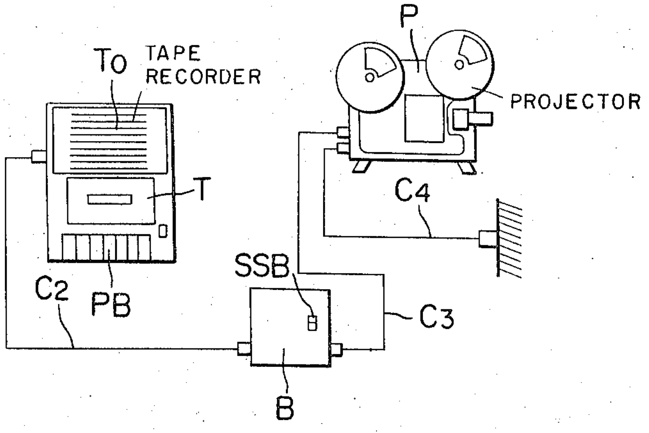

FIG. 2 shows the constitution of said tape recorder To, and the symbol T designates a tape housed within said tape recorder To. SP is a program switch which will be explained hereinafter, VOL is sound controlling switch. In order to control the console portion of said tape recorder To by pushing down buttons, there are provided the following mentioned buttons to meet the foregoing control, such as, the button R.B. for sound recording, the button F.F. for fast forwarding, the button P.B. for playing back, the button F.R. for fast rewinding the button I.S.B. for instantaneous stopping and the button S.B. for stopping operation. The operative mode in conventional mechanism or the inventive mechanism hereinafter described is variable by the action of the aforementioned buttons.

The operation of simultaneous recording with a camera will hereinafter elucidated in connection with FIGS. 1 and 2.

The mechanism is constructed in such a manner that the conventional drive source of said tape recorder To is actuated to be active by shifting the program switch S.P. of said tape recorder To to "ON" position so as to be ready for tape feeding motion as well as to be ready for photographing the start mark of exposure means, for instance, conventional mark photographing means provided on the side of the camera C to irradiate through an illuminating means to the position where image of the film will not be influenced by said exposure light.

Since the tape feeding mechanism of the tape recorder To is loaded slightly and is provided with a time starting and halting means therewithin, slippage between the tape feeding motion and the film feeding motion will be less than one frame of a film, or at the largest will easily be adjusted within the range of one frame to three frames. In this instance, the button R.B. for sound recording and the button I.S.B. for instantaneous stopping are respectively held in pushed-down position previously. Thus, the camera C is released, for instance, electromagnetically by pushing down the release button thereof, and at the same time, the start mark is instantaneously recorded at the position corresponding to the starting part of the photographing scene of the film through said start mark photographing means which is actuated upon detecting the release signal. Upon recording said start mark, the tape recorder To is sensed to detect the release signal of a camera for shifting the tape travelling means from the initial position for preparation to the position for action, so that the tape travelling motion is instantaneously put in action. During the tape travelling motion, sound signal from the microphone M as well as pulse-train from the camera C are respectively recorded on the tape. In this camera C, provided with a detecting means for film feeding rate, such as a switching device of conventional type, to detect the film feeding rate of the film feeding mechanism and to generate an electric pulse signal. Accordingly, at the stage of simultaneous recording with a camera, sound signal as well as signal containing pulse-train which corresponds to the film feeding rate of a camera are respectively recorded on the tape through the tape recorder To. When photographing is completed, signal from a camera for informing completion of photographing is recorded on the tape, for instance, as an electric signal of frequency 1 KHz, persistency hour 50 – 150 ms. Means for generating said electric signal is provided on the tape recorder To and is actuated by signal from a camera for releasing information of the release button. Said tape feeding mechanism is set to be effective for timing action by said release informing signal of release button so as to stop the tape feeding motion instantaneously upon said signal for completion of photographing on the tape. Subsequently, each scene is photographed through several steps as shown in the drawings and thus sound recording synchronized with photographing has been completed, but the tape recorder is still kept in motion, so that electric power consumption will be saved by pushing down the stop button S.B.

According to the foregoing mechanism, sound signal from a sound receiver together with release start signal, a series of pulse-train signal and release stop signal from a camera can be recorded respectively on the tape of the tape recorder To. In this case, as for the tape recorder, tape feeding apparatus is instantaneously started by said release signal, that is, start signal from a camera, and said pulse-train signal corresponding to the film feeding rate of a camera is recorded on the tape, then said tape feeding apparatus can be stopped in its motion instantaneously by said signal from a camera for informing completion of photographing. Furthermore, the start mark is recorded on the film by said release signal of a camera, that is, the starting signal for the film feeding motion as well as the stop mark corresponding to the releasing signal for the release button of a camera, namely, the stop signal for releasing can be recorded on the tape, and said stop mark can be recorded on the film by said mark photographing means provided within a camera.

In this instance, particularly important function of the mechanism lies in the fact that the tape feeding apparatus of a tape recorder is stopped instantaneously by the release stop signal from a camera. Thereby, the system according to the present invention brings about advantageous effects in operation described hereinafter.

In case, projection with sound is effected for synchronized reproducing through the tape continuously recorded with a camera in simultaneity by means of the aforementioned process, the cord $C_1$ arranged between the tape recorder To and the camera C is disconnected. Then the cord $C_2$ is connects the tape recorder To with the synchro box B. The cord $C_3$ is arranged to connect the synchro box B with the projector P. The power cord $C_4$ of the projector P is arranged to connect with the power source. When the system start button S.S.B. of the synchro box B is being set to play back position, the set signal is transmitted to the projector P for starting the film feeding motion of said projector P through the mechanism which is described hereinafter. When a film is fed to some extent until it reaches the start mark position of the initial scene, the motion of the projector P driven by the button SSB is stopped upon the detection of the start mark and the film is set to the start position. By pushing the button PB for reproducing the tape simultaneously recorded with a camera which tape is separately set to the start position in the tape recorder To, a sound signal is reproduced through a speaker and is recorded on the tape. The first pulse of the pulse-train signal corresponding to the film feeding rate, that is, the starting signal of the projector is applied to the projector P through the cord $C_2$, the synchro box B and the cord $C_3$, and thus the projector P starts its motion. Subsequently, the film feeding rate of the projector P is controlled accurately by means of the pulse-train signal passing through the below-mentioned electric circuit so as to achieve synchronized reproducing of a film with a tape in extremely high precision. The pulse-train signal is reproduced by the tape recorder To and is applied to be input to the synchro box B and said signal corresponds to the film feeding rate of a camera.

In this case, means for generating a pulse-train corresponding to the speed of the film coming from the projector is provided in the below-mentioned circuit. The pulse-train signal from said means is fed back to the synchro box B for comparison with the pulse-train from the tape. Thus, the projector is adapted to be driven in synchronization with pulse-train from the tape. Although an end signal for photographing scene, for instance, of 1 KHz from the tape is reproduced, the button I.S.B. for instantaneous stopping of the tape feeding motion is released. Thus both the tape and the film are continuously fed to reproduce the photographed scene of the next sequence and sound corresponding to said next scene. Upon reaching the final scene, the pulse-train from the tape corresponding to the film feeding rate is used up and the film feeding motion of the projector is automatically halted. If the mechanism is constructed in such a manner that the system start button SSB of the synchro box B is reset and the play back button PB is also reset by detecting the film feeding motion of the projector being halted, thus the system is completely reset. Another mechanism may be constructed in such a way that the play back button PB is previously arranged to be reset for actuating similar steps of action so as to be capable of starting the system by operating only the system start button SSB and to carry out resetting the system by halting the film feeding motion of the projector.

In case, electric power to be fed to the projector P is controlled by detecting particularly the pulse-train signal from said projector P, the aforementioned mechanism may be constructed in such a manner, for instance, that the synchro box B includes a reference oscillator a change-over means. Thus the pulse-train signal from said reference oscillator is adapted to be automatically produced when the pulse-train signal from a tape of the tape recorder To is not turned to be output so as to be able to function fully in place of said pulse-train signal from the tape which corresponds to the film feeding rate of a camera. With the foregoing mechanism, the starting action of the projector may be controllable which is found to be further advantaneous in the following described system for intermittently synchronous recording with a camera.

According to the aforementioned mechanism, the pulse-train signal from the tape on which recorded the pulse-train signal corresponding to the film feeding rate of a camera is reproduced together with sound signal and also the pulse-train signal corresponding to the film feeding rate of a projector is detected, whereby the film feeding rate of the projector P can be controlled of its drive by phase difference of said two signals. Moreover, the projector is actuated to start by a system start means, sound signal of a tape can be instantaneously reproduced by the start mark recorded on the film, and the feeding motion of a tape or a film may be instantaneously stopped by the stop mark recorded on the tape or the film which is put under synchronized reproducing condition.

The system for intermittently simultaneous recording with a camera disclosed in the above-mentioned classification (C) will now be elucidated in detail with reference to FIGS. 1 and 2 by way of an example.

In the first place, when the program switch SP of the tape recorder To is shifted to "ON" position for simultaneous recording with a camera as shown in FIGS. 1 and 2, a driving source of the tape recorder To is changed over to "ON" position to be ready for tape feeding motion as well as for recording the start mark of the side of a camera. Under the foregoing condition, when a release button of the camera C is pushed down, the camera C is released, for instance, electromagnetically and the start mark is instantaneously photographed on the scene starting part of the film to cause the starting drive of a tape feeding mechanism, then the pulse-train signal from the camera C together with sound signal through the microphone M are respectively recorded on the tape T. When the release button is put to be free from pressure, photographing completion signal from a camera is recorded on the tape and the film feeding mechanism is halted in its motion and is immediately reset to an instantaneously arrested condition.

In the next place, when simultaneous recording with a camera is not performed, the program switch SP is shifted from the condition shown in FIGS. 1 and 2 to asynchronous recording with a camera, thereby the driving source of the tape recorder To is changed over to "OFF" position. Under this condition, the camera C is adapted to be released by pushing down the release button of said camera C. However, the start mark will not be photographed on the scene starting part of the film and the tape feeding motion is not driven. When said release button is put free from pressure, the camera will be halted, but the tape recorder To is left to be in the "OFF" condition.

In case of changing-over to simultaneous recording with a camera, the program switch SP may be set to the condition as shown in FIGS. 1 and 2.

According to the above-described assembly, intermittently simultaneous recording with a camera is carried out continuously on the tape of the tape recorder To. In this instance, the program switch SP is connected in series within the signal path of the camera release signal.

Due to the foregoing process, the program switch SP housed within the synchro box will be effective on the "OFF" position thereof for rendering the tape recorder unworkable and also make possible the intermittently simultaneous recording with a camera in synchronization of the film and the tape which makes it impossible to record the start mark on the film so as to eliminate waste of tape as well as to improve the precision in synchronization between after-recording and projection with sound.

The system wherein the tape for said intermittently simultaneous recording with a camera is used for the so-called after-recording process carried out by inserting simultaneously recorded sound in the travelling film intermittently will now be explained with reference to FIG. 4 by way of an example of said system.

If the initial scene is not recorded with sound thereon simultaneously with a camera or the start mark is not photographed on said initial scene on the reason of editing even though said initial scene has been recorded with sound thereon simultaneously with a camera, the film is previously provided with a sort of marks mechanically, electrically or optically recorded thereon such as, for instance, a notch or white printed mark for the convenience of setting the start position on the film.

When the system start button SSB of the synchro box B is set to "record ready" under the following function that the tape recorder To is connected with the synchro box B through the cord $C_2$, said synchro box B is connected with the projector P through the cord $C_3$, furthermore said synchro box B is connected with the synchro heads Hs through the cord $C_5$, said tape recorder To is connected with the tape recorder Tm through the dabbing cord $C_{10}$, and each of the cords $C_4$, $C_7$ for power source is connected with corresponding power source respectively, drive of the projector P is controlled by the synchro box B in a form of phase comparison between the pulse-train signal coming from a reference oscillator provided within said synchro box B and the pulse-train signal generated in the projector P which is fed back to the synchro box B, thus the film feeding apparatus starts its motion by the drive of the projector at the rate corresponding to the reference pulse-train signal, and after the start mark in the initial scene (containing the title) of a film is detected, the film feeding apparatus is halted in its motion in the state that a film has been set to the start position. In this stage as mentioned above, the buttons PB and ISB of the tape recorder To are shifted to "ON" position respectively, then the tape recorder Tm is set to be ready for sound recording. In the next step, the after recording start switch $S_A$ provided within the synchro box is shifted to "ON" position. The tape recorder To is halted in its tape feeding motion, but a signal from the synchro head Hs as well as a sound signal from the microphone Mm are recorded on the tape recorder Tm. In case, the sound of the initial scene has been recorded on the tape recorder To simultaneously with a camera, the scene start mark recorded on a film is detected and the tape recorder To starts its tape feeding motion immediately in response to the detected start signal. Concurrently a change-over switch interlocking with an instantaneous starting relay provided within said tape recorder To is cut over. Furthermore, a sound signal recorded on a tape as well as pulse-train signal corresponding to the film feeding rate of a camera are reproduced. Thus a control signal for driving a projector is cut over from the output signal of an oscillator housed within the synchro box B to a signal of a tape mounted in the tape recorder To, that is, for instance, one frame of a film in a camera to pulse signal. The above-mentioned signal of a tape is recorded on a signal channel independent of a sound recording channel in a form of dabbing effect through the cord $C_2$, the synchro box B and the cord $C_5$ as a pulse-train signal at the time of simultaneous recording with a camera on the tape of the second tape recorder Tm. Thus the film feeding rate of the projector P is controlled by a pulse-train signal of simultaneous recording with a camera through the cord $C_2$, the synchro box B and the cord $C_3$. As the instantaneous stopping button ISB which has previously been set is kept in the set position due to a scene end signal reproduced from the tape recorder To, the tape feeding motion thereof is stopped. At the same time, said control signal is actuated to be fed back from a signal of a tape mounted in the tape recorder To to the output signal of an oscillator provided within the synchro box B. Thus the projector P is adapted to carry on projection operation of sequent scene under the constant speed control by the output signal of an oscillator. In this instance, when sound signal for after-recording is applied to be input force to, for instance, the microphone Mm of the tape recorder Tm corresponding to projecting scene, after-recording operation is effected on the tape of the tape recorder Tm. In this case, the projecting speed of the projector P is controlled by reference pulse-train signal from a reference oscillator provided within the synchro box B and reference pulse-train signal taking the place of a pulse-train signal from the tape recorder To is recorded on another signal channel independent of a sound recording channel in the tape recorder Tm. When the scene of simultaneous recording with a camera appears for the second time, the tape recorder To starts its tape feeding motion again instantaneously by the influence of the start mark recorded on the film of the projector P, thus the sound recording signal of said tape recorder To is effected to be dabbed to the tape recorder Tm and the control signal of the projector P is cut over from the output of an oscillator provided within the synchro box B to the pulse-train signal reproduced by the tape recorder To, then the tape recorder To is instantaneously stopped in its motion upon the end signal being reproduced by the tape recorder To.

The afore-described system will be explained in detail with reference to FIG. 5 as follows:

This drawing shows the relation to one another among the film FILM edited on the foregoing function of mechanism, the tape $TAPE_0$ of the tape recorder To to be used for simultaneous recording with a camera, the tape $TAPE_m$ of the tape recorder Tm for after-recording operation, and a signal SIGO of an oscillator.

Reference symbols $CUT_1$ – $CUT_6$ respectively designate the scene sequence of each scene and sound sequence positions corresponding to said scene sequence. $GM_0$ – $GM_3$ are the start marks and marks for the start position setting of a film.

Figures 4, 6:
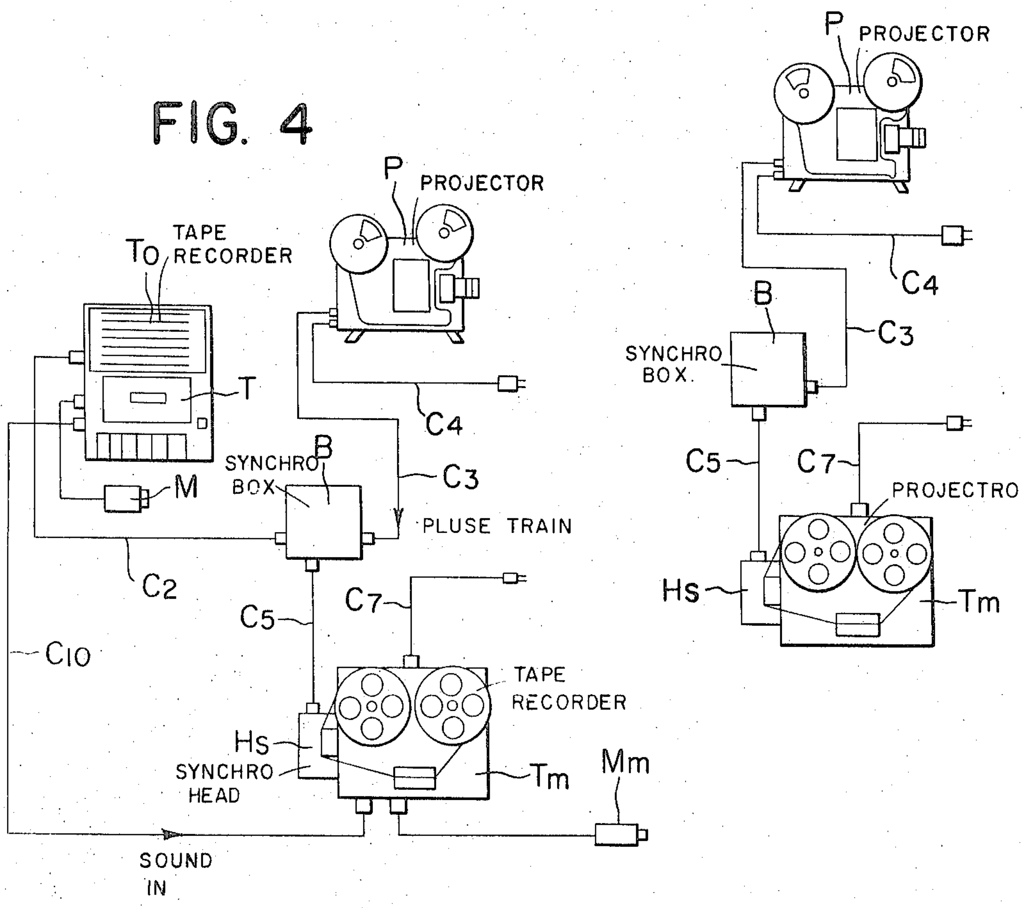
FIG. 6 is a schematic diagram of the system according to the present invention showing the condition at the time of reproducing operation in a form of another embodiment.
Figure 5:
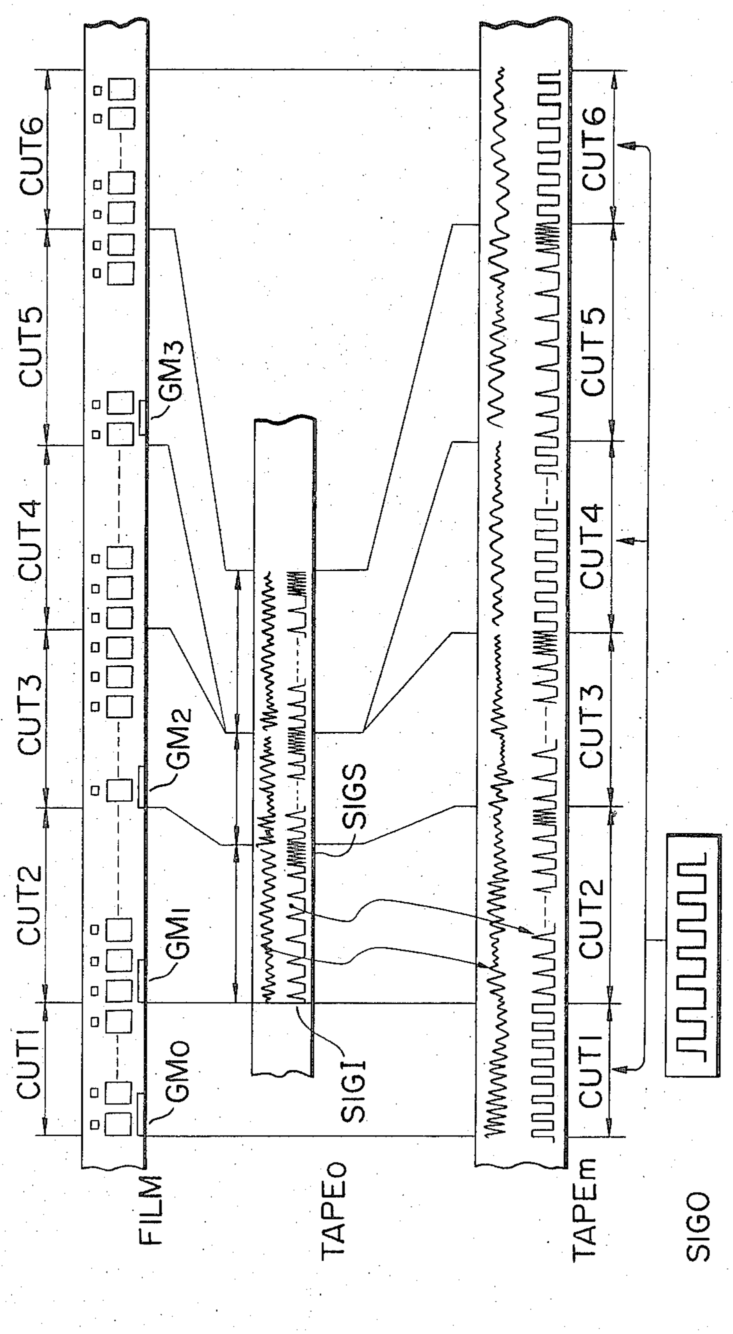
FIG. 5 is a plane view of the system according to the present invention showing signal recording condition of a film and a tape formed in the inventive system.

Explanation of mechanism shown in FIG. 4 will be repeated with reference to FIG. 5 in the followings:

The start position setting of a film FILM is finished at the first mark $GM_0$ recorded on the film FILM and the projector P is stopped. In this stage, the tape recorder To is in the reproducing made. Subsequently the after-recording tape recorder Tm is actuated to start in the state ready for sound recording, then the after-recording start switch SA is cut over to "ON" position for effecting the signal SIGO from an oscillator to be recorded through the synchro head Hs, said sound recording is carried on until one cut $CUT_1$ of a film is passed through and when the subsequent cut $CUT_2$ of a film appears, the next start mark $GM_1$ is detected and the tape recorder To starts its motion. Thus the signal $SIG_I$ of simultaneous recording with a camera is reproduced by the tape $TAPE_O$, while in said next cut $CUT_2$ of the tape TAPEm, the signal $SIG_I$ is recorded in place of the signal $SIG_O$. This cut-over operation is automatically carried out as is previously mentioned. When the cut $CUT_2$ of a film has passed through, the tape recorder To is reset to the halting or the starting condition due to the stop signal $SIG_S$ and a signal of the tape TAPEm is recorded with sound of the signal $SIG_O$. In this way, the signal $SIG_I$ and the signal $SIG_O$ respectively are recorded by the start marks $GM_2$, $GM_3$, and finally dabbing of simultaneous recording with a camera and portions of after-recording are able to be recorded on the tape TAPEm. The tape recorder To for simultaneous recording with a camera is no longer needed for reproducing, but the tape TAPEm thoroughly synchronized with the complete editing film FILM may be used for reproducing as shown in FIG. 6.

By repeating the foregoing process, a signal train from an oscillator housed within a conventional synchro box and pulse-train signal generated by simultaneous recording with a camera are sequentially recorded on the tape of the after-recording tape recorder Tm, thereby after-recording and simultaneous recording with a camera both of which correspond to the above-mentioned sequential recording are able to be recorded respectively in an accurately synchronized condition. Upon completion of reproducing in the last scene, the whole system is turned to a reset condition as occasion arises.

As will clearly be understood through the foregoing explanation, in this case, control signal at the time of dabbing is supplied from the tape recorder To, another control signal at the time of after-recording is supplied, for instance, from the inside of a synchro box as reference pulse signal train to be recorded on the tape recorder Tm and are effected for controlling the speed of the projector P. Such cut-over operation as mentioned above is, of course, carried out automatically.

When the start scene is not available for simultaneous recording with a camera, an instantaneous stopping mechanism is not operated, but first of all after recording by means of reference pulse signal is performed, and dabbing similar to the aforementioned is done in the scene of simultaneous recording with a camera. It is optionally selective whether sound signal of the tape recorder To is printed on the tape recorder Tm through the dabbing cord $C_{10}$ (refer to FIG. 4), or on the tape recorder Tm through the synchro box B and the synchro head $H_S$. However, sound signal may be preferable through the cord $C_{10}$ while control signal may be proper through the synchro head $H_S$.

The operation of the mechanism wherein the projector P is connected with the synchro box B through the cord $C_3$ and the synchro box B is connected with the synchro head Hs through the cord $C_5$ and cords $C_4$, $C_7$ for the power source are connected respectively with the corresponding power source will be elucidated with reference to FIG. 6 as an example in case of projection with sound synchronizing the reproduced sound coming from after-recording tape.

Supposing the start position has been set on the film of the tape recorder Tm, the projector P is actuated to start its motion by setting the system start button SSB of the synchro box B to the reproducing condition, and the operational speed of said projector P is controlled by pulse signal train coming from an oscillator in the synchro box B until the start mark for simultaneous recording with a camera recorded on a film is detected by the film feeding apparatus provided on the projector and then controlled by the pulse signal train recorded in the tape recorder Tm. In this instance, when a film of the projector P is set at the start position by the start position setting mark recorded on the film and is stopped its motion, then the tape recorder Tm is set at its play back action, sound is sequentially reproduced from a speaker of the tape recorder and sequentially projected scene synchronized with said reproduced sound is carried on by the projector. Upon the ending of projection with sound, the button SSB is turned to the "OFF" condition for rewinding the tape of the tape recorder Tm as well as the film of the projector P, thus subsequent projection with sound is ready for the next operation.

In the present invention, it has been explained mainly for such a case that the first pulse of system control pulse signal train for corresponding sound is adapted to cope with the recording or reproducing of the start mark of scene sequence, and the end mark to be recorded at the time of simultaneous recording with a camera is also adapted to cope nearly with the last pulse of system control pulse-train for scene.

However, in case, for instance, reproducing of after-recording, it may be advantageous to arrange the mark for start position setting of projecting film at the position far spaced from the start position of scene or to make said mark long enough to cover several frames of a film.

The above embodiment has been elucidated on the process in which pulse signal train corresponding to the film feeding rate is recorded on a tape for controlling the synchronized drive of a projector by means of said reproduced pulse, however, it is very advantageous for such case as the tape feeding mechanism in the present invention wherein instantaneous starting as well as instantaneous stopping operations are available for the following constitution of the system that pulse signal train from a projector is recorded on a tape, and synchronized drive of a projector is controlled by said reproduced pulse, or that the former and the latter processes are applied together in the system.

Moreover, projection of slide synchronized with sound and sound recording therefor is easily carried out by a person skilled in the art using the same tape recorder for said two combined processes by interconnecting the tape recorder To, the cord $C_2'$, the control box B′, the cord $C_3'$, the slide projector P′ with one another and connecting the power source cord $C_4'$ with power source and detailed explanations on this process will be deleted.

Figure 7:
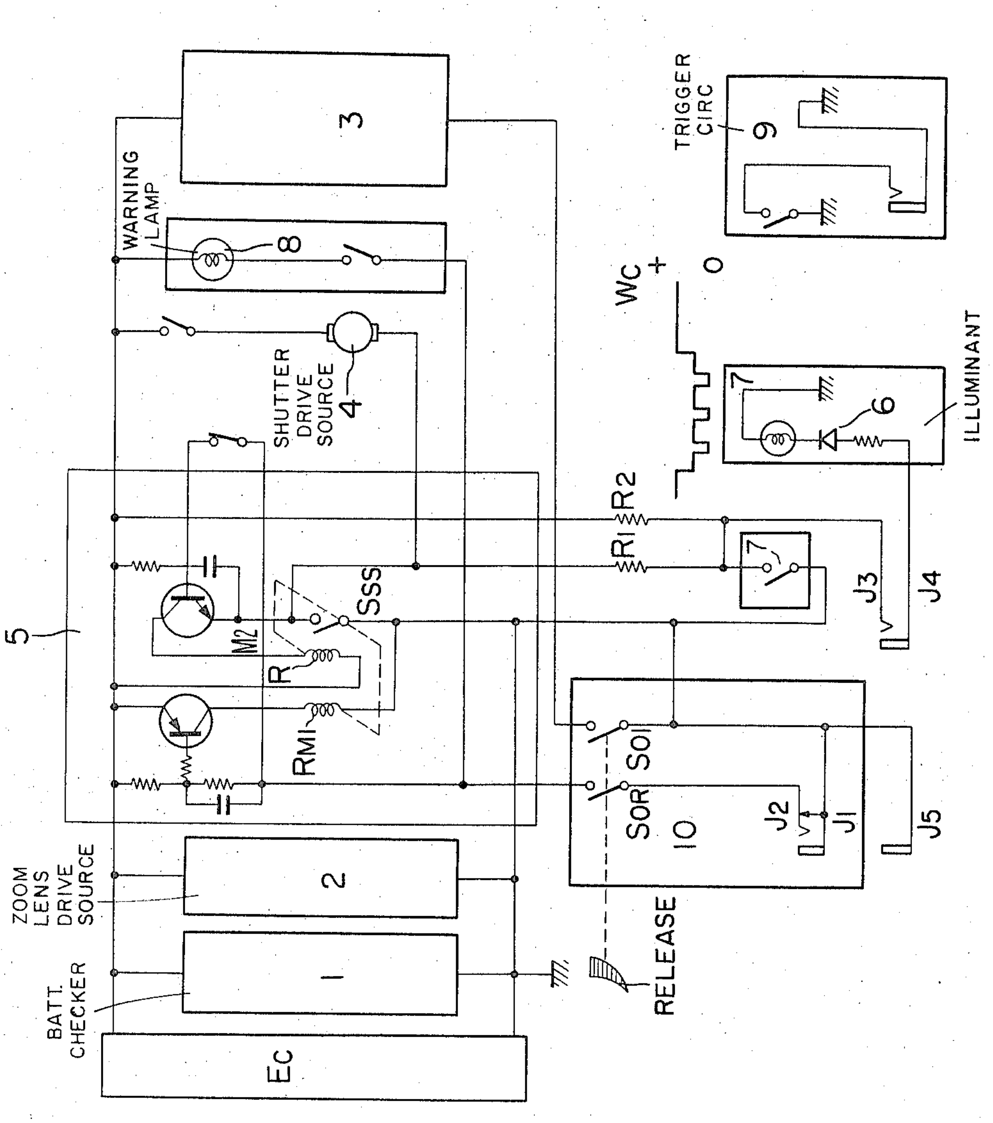
FIG. 7 is a block diagram of electric circuits in a camera applicable to the system according to the present invention.

One example of connecting diagram of electric circuits provided within 8 mm cine-camera which is very favourable for realizing the sound recording system of the present invention will now be explained briefly with reference to FIG. 7.

In the drawing, electric power source Ec is provided, as load function, with a circuit group comprising a battery checker 1, zoom lens drive source 2, diaphragm drive source (servo) 8, shutter drive source 4, a control device 5 for said shutter drive source 4, illuminant 6 for recording the start mark, one frame by one pulse oscillation source 7 interlocking with film feeding motion, warning source 8 for few remaining of a film, trigger circuit 9 for multi-flash connected at the other end thereof with minus earth through a shutter and a trigger switch interlocking with the movement of revolution of a shutter and synchronized with film exposure, and a release circuit 10 having a jack for remote control of camera release. Terminals $J_1$ and $J_2$ are used for remote control function. The terminal $J_4$ of start mark source 6, the terminal $J_3$ of oscillation source 7 and an earth terminal respectively are adapted to be connected with the tape recorder To.

When a release button is pushed downward, the switch $S_{OR}$ or $S_{01}$ of the release circuit 10 interlocking mechanically with said release button is cut over to "ON" position, a transistor connected in series with a magnet $RM_1$ provided within the control device 5 is cut over temporarily to "ON" position for actuating said magnet $RM_1$, and the switch Sss is also cut over to "ON" position to be mechanically held, thus the shutter drive source 4 is actuated to be excited. At the same time, terminal voltage in the terminal $J_3$ is converted from plus potential of electric power source Ec to minus potential which is partially pressured by resistances $R_1$ and $R_2$, subsequently, potential of the terminal $J_3$ is further converted rapidly into minus potential to earth due to a switch of the oscillation source 7 being shifted to "ON" position. This pulse signal is supplied in the course of releasing to the terminal $J_3$ as pulse-train. After releasing a release button, switches $S_{OR}$ and $S_{01}$ in the release circuit 10 are shifted to "OFF" positions, and a transistor connected in series with the magnet $RM_2$ equipped in the control device 5 is temporarily set to "ON" position for actuating the magnet $RM_2$, thereby the switch Sss which is released from mechanical hold is cut over to "OFF" position, and the shutter drive source 4 is stopped, thus said terminal $J_3$ is returned to plus potential from the partially pressured value. Accordingly, wave potential designated by Wc as shown in the drawing is effected to appear in said terminal $J_3$. Said wave potential Wc is superposed with two informations, that is, a release signal and a film speed signal for one frame of a film — one pulse. Thus, one set of a connector jack and connector cord will be plenty enough for the above mechanism in which it has commonly been necessitated for two sets of the same, so that said mechanism can be produced easily as well as cheaply. Synchronized exposure with flash is carried out by such process that a trigger plug of a flash device is inserted into a jack for multi flash, and a trigger switch is cut over to "ON" position at the time of exposure, while at the time of closing shutter said trigger shutter is shifted back to "OFF" position; and in the reverse process, it is possible to obtain active focus detecting by means of, for instance, a focus detecting device locating in the light path instantly by shifting said trigger switch to "OFF" position at the time of opening shutter and to "ON" position at the time of closing shutter, thereby, function of automatic focussing will be effected to a camera through the steps of indicating focusing condition by means of the detected output of said device and of controlling the drive of a drive source for a lens focussing mechanism.

In the next place, sound synchronizing control system is particularly emphasied in the identified system among electric circuits to be arranged in the tape recorder To, while elucidation on other electric circuits serving as a drive source for tape feeding operation, or as recording, erasing, playing back or reproducing and the like are eliminated in this passage of the specification, since said circuits have been well known to those belonging to the same technical field of industry. The connecting diagram of electric circuits will now be explained briefly with reference to FIG. 8 by way of an example. In this drawing, switches $SP_1$ – $SP_8$ arranged within corresponding boxes illustrated in chain-dotted lines are respectively shown of their closed condition, which is meant to be able to cut over signals to "OFF" position at the time of passing through said switches corresponding to the system and also to be able to construct the tape recorder To as a device having no circuit at the destination of these signals; thereby, various kinds of embodiments will be obtainable. Furthermore, other constitutional members besides the tape recorder To are indicated in block diagrams.

In the drawing, a block 11 designates signal source provided with, for instance, switching circuit, a capacitor, resistance for charging path to a capacitor, electric discharge path from a capacitor and the change-over switch $St_1$, the output of said signal source is connected through the terminal $J_4$ with, for instance, a lamp light source mounted within the camera C, so as to set the film at the start position, thus said signal source is adapted to be charged with an electric power enough for driving one frame to 3 frames of a film. The reference numeral 12 is a wave forming circuit of bias setting for charging the output therefrom during the input of wave potential Wc is charged from the camera C to said circuit 12, said output is subjected to control the drive of load $RL_1$ through the output circuit 13. Accordingly, by inserting the switch S between the camera $C_1$ and the circuit 12, said switch S is shifted to "ON" position optionally in the course of photographing, thus a film is printed with, for instance, a white mark for setting the film start position and the relay $RL_1$ is excited to be able to shift the tape recorder To to the sound recording condition. In the similar way to the abovementioned process, said switch S is optionally cut over to "OFF" position at any time for halting the drive of the tape recorder To so as to print the stop mark on a film which will be explained hereinafter. When the relay $R_1$ is set at "ON" position, the change-over switch $St_1$ is cut over from the position shown in the drawing to the side of discharge time constant circuit and switches $St_2$, $St_3$ are cut over from the position shown in the drawing to the side of released terminal. In addition, $St_4$ is a hold switch of the relay $RL_1$. 14 is a circuit, a conventional differential circuit composed of resistance Rd and a capacitor Cd and a conventionally known discriminating circuit D which serve for discriminating pulse signal train of one frame — one pulse from said release signal among the wave form Wc coming from the camera C and also for differentiating in said differential circuit so as to supply said pulse signal train to the sound recording and reproducing head HWR. 15 is a conventional oscillation source of, for instance, 1 KHz for recording a signal of about 1 KHz by scores millisecond, that is, a signal enough for scores of pulse by making use of delay time occurs in the relay $RL_1$ as a drive source for instantaneous stopping mechanism, thus the tape is stopped.

The delay time occured in said relay $RL_1$ causes finishing of action in said relay $RL_1$ under the condition of scores of millisecond delay when the releasing signal wave Wc from the camera C disappears so as to shift the control circuit 13 to "OFF" position. By the function of the foregoing delay time, a tape is subjected to travel for score of milliseconds from the finishing of said wave signal Wc. In other words, the delay time peculiar to said relay $RL_1$ is adapted to be utilized. In order to get rid of the foregoing delay, conventional relay circuit artificially arranged with an electric element such as transistor or the like may be used for obtaining a further punctual function of time recording on said tape after the stop signal for a tape has appeared. CP designates a capstan for feeding a tape of the tape recorder To, RP is a pinch roller which has an interlocking relation with the relay $RL_1$. Among those which influences load on the power source ETo of the tape recorder To, sound system at the time of simultaneous recording with a camera and drive source for tape feeding are similar to conventional ones which are commonly used in the present industry, so that description on said sound system and the drive source will be eliminated in this passage of the specification. However, if said load circuit group constituted as mentioned above is provided within the foregoing tape recorder To, the system of simultaneous recording with a camera elucidated with reference to FIGS. 1 and 2 will definitely be realized.

Now, it will be explained on the circuit indispensable for reproducing pulse signal train and stop signal by the head HWR.

The reference numeral 16 designates a pre-amplifier, 17 is the output circuit, 18 is an integrating circuit having an appropriate damping characteristics which is effective for integrating only 1 KHz signal among two signals recorded on a tape and composed of, for instance, one frame by one pulse signal and, for instance, 1 KHz signal, and said integrated 1 KHz signal is loaded as the output signal for driving the relay $RL_2$. Said relay $RL_2$ is an instantaneous stop relay of a tape recorder at the time of reproducing operation and is interlocked with the switch St5 for actuating an instantaneous stop device which is set to be "OFF" condition when said relay $RL_2$ is cut over to "ON" position. 19 is the oneway switch comprising a diode for transmitting signals to the synchro box B.

Due to the foregoing function, it is applicable for recording, and the relay $RL_1$ keeping its own position will be released only at the time for reproducing projection by the relay $RL_2$.

The above explanation refers to the tape recorder having an instantaneous starting and stopping mechanism interlocking mechanically with the relay $RL_1$. In case, said instantaneous starting and stopping mechanism are electrically interlocked with the relay $RL_1$, said mechanism can, of course, be actuated identically with the action of said relay $RL_1$. Moreover, said relay $RL_1$ may be converted into an electric equivalent circuit for actuating switches $St_1$ – $St_4$ electrically.

The type of the processes and each of the foregoing devices may preferably be modified on the reason of space, consumption of electric power and indispensable faculties or the like.

Figure 8:
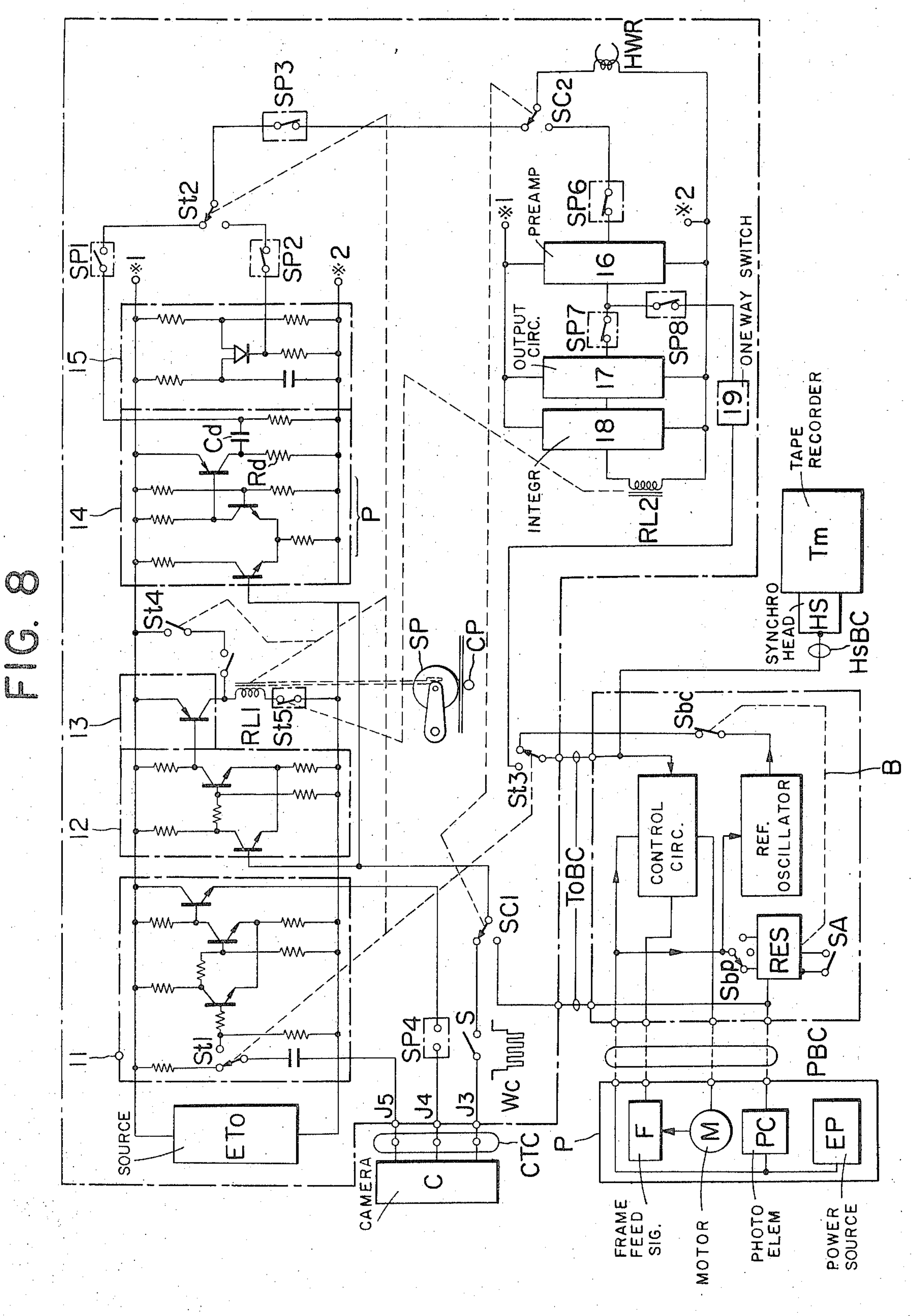
FIG. 8 is a connecting diagram showing an example of circuit block in the system according to the present invention.
Figure 9:
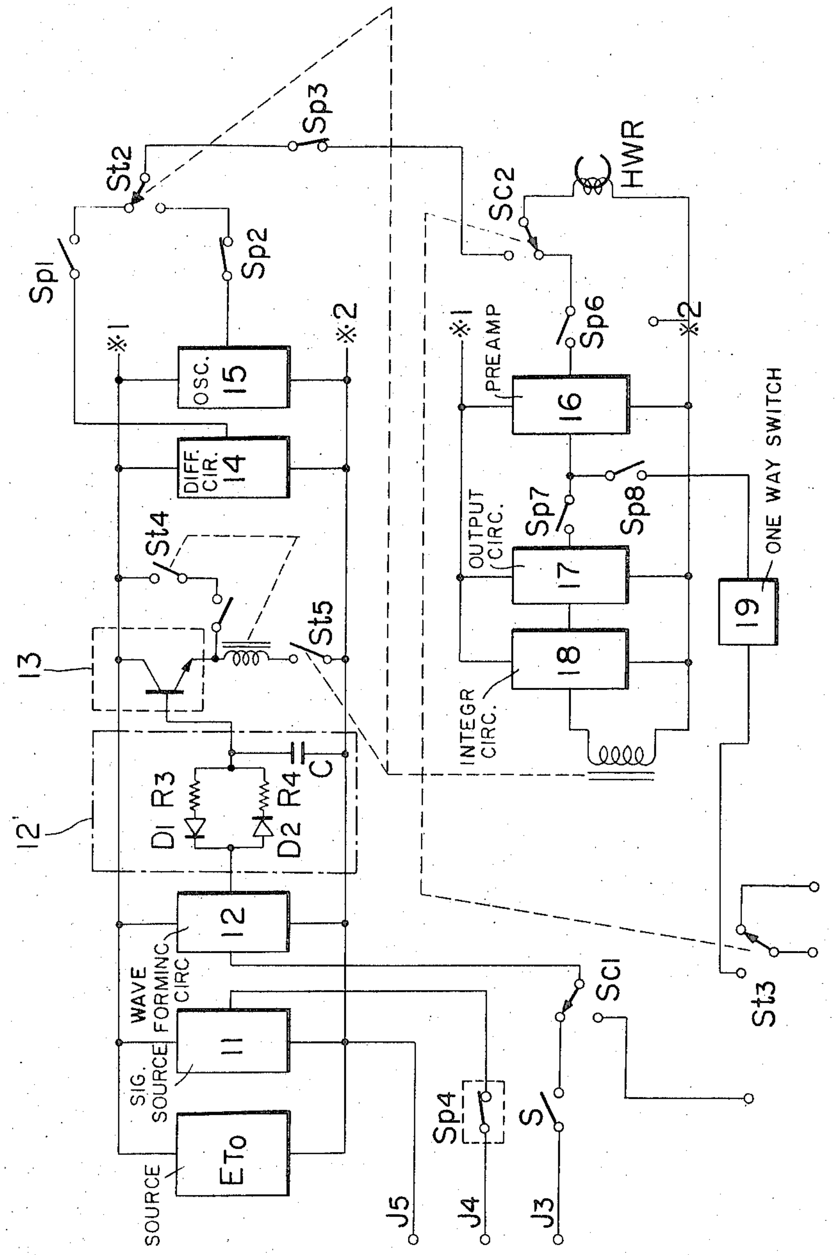
FIG. 9 is a connecting diagram of electric circuits in the modification shown in FIG. 8.

FIG. 9 is a modified block diagram of electric circuits shown in FIG. 8.

12' is a delay circuit comprising resistance $R_3$, $R_4$ and diode $D_1$, $D_2$, and other constitutional elements are similar to those indicated in FIG. 8 which are illustrated in block diagrams. Moreover, the camera C, the synchro box B' and the projector P are erased from the drawing.

The function of the foregoing delay circuit is such a manner that the relay $RL_1$ is adapted to actuate usually to be delayed by several milliseconds to the decaying portion of the release signal Wc; namely, action signal of the relay $RL_1$ against the release signal Wc comes from the camera C, and returns to be delayed by several milliseconds to the rising portion of the release signal Wc, that is, a return signal of the relay $RL_1$, thereby causing several millisecond difference between the duration of the release signal Wc and the travelling time of a tape. This difference is accumulated as an error when a certain number of frames of screen are photographed in the synchronized photographing of the camera C and the tape recorder To for simultaneous recording with a camera, whereby it becomes impossible to carry out accurately synchronized projection in case of projection in synchronization with film and tape. Thus, said delay circuit 12' is added to the mechanism shown in FIG. 8 so as to coincide the duration of a release signal with the tape travelling time by setting proper delay time respectively at the decaying portion of the release signal Wc. Thus it is able to carry out highly accurate projection in synchronization of film and tape.

Figure 21:
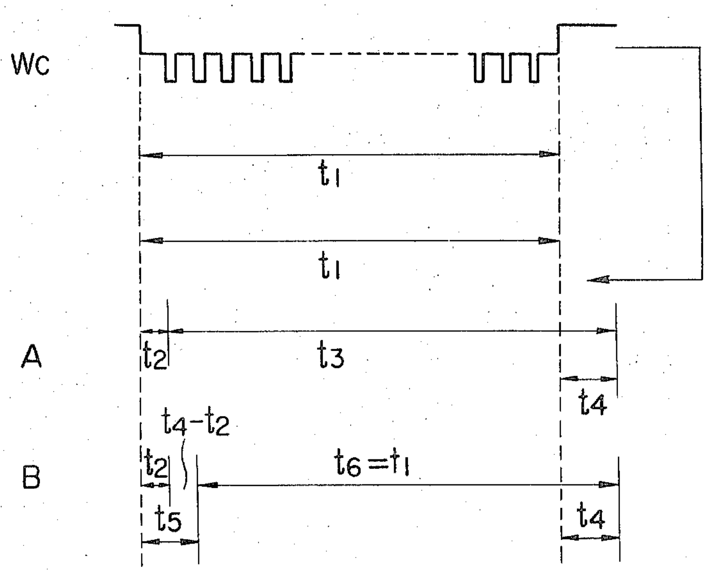

FIG. 21 shows the tape travelling time $t_6$, the delay time $t_5$ and stop delay time $t_4$ respectively in two cases A and B. The former case A contains release time (operative time of a camera) $t_1$ and instantaneously action stopping mechanism of the tape recorder To, while the latter case B contains tape travelling time $t_3$, start delay time $t_2$, stop delay time $t_4$, and said delay circuit added to instantaneously action stopping mechanism of the tape recorder To.

The connecting diagram of the electric circuits shown in FIG. 8 will further be explained in connection with the above-mentioned modification. In the case A in which no additional element is used in addition to the instantaneous action stopping mechanism, the starting and stopping operation of a tape will be accompanied by delay time $t_2$, $t_4$ while the tape travelling time $t_3$ relative to the release time $t_1$ is calculated by the following formula:

$$t_3 = t_1 + t_4 - t_2$$

Thus, $t_3 > t_1$ and the difference comes to $t_4 - t_2$. If one roll of a film is used for photographing several times, said difference $t_4 - t_2$ will be increased by several folds. When a film and a tape are synchronously reproduced to be projected continuously, it will be taken place 5 – 6 frame delay of a film in the latter half stage of reproducing projection. In this instance, the tape travelling time $t_6$ is made equivalent to the release time $t_1$ by artificially providing, for one example, a proper delay time $t_5$ which is equivalent to the tape stopping delay time $t_4$, to the rising portion as is mentioned in the foregoing case B. In this case, about one frame delay of a film takes place in every scene, and said one frame delay of a film will not be greater in the end portion of a film.

Another constitutional parts of the electric circuit which are shown commonly in FIG. 8 and FIG. 9 will be explained hereinafter.

In FIG. 8, CTC is a connection between the camera C and the tape recorder To, PBC is a connection between the projector P and the synchro box B, ToBC is a connection between the tape recorder To and the synchro box B, and HsBC is a connection between the head Hs and the synchro box B. The synchro head Hs is a magnetic recording and reproducing head effective for recording or reproducing synchronization signal on channels besides the sound channel for synchronization tape, and said head Hs is mounted in the tape recorder Tm. F, M, PC respectively designate a signal source for the frame feeding rate or the film feeding rate of the projector P, a film driving motor of the projector P, and a photo-electric transducing element for detecting the mark of start position setting of the film. The projector P is provided with the power source EP which is adapted to be supplied to the motor M through the synchro box B, and said supplied power is effective for controlling the rotational speed of said motor M. In the foregoing circuit, connections of noncontact may be arranged between each device, or terminals are adapted to be used in common, or circuit may be simplified by providing more terminals therein as occasion requires, whereby compatibility of each device with other system is obtainable as well as partition or combination of each device is carried out as occasion demands. For instance, a system with high performance and accuracy is constructed by recording on the projector P with the content of the synchro box B together with the content of the tape recorder To, or by integrating the tape recorder To and the synchro box B with each other.

It is a matter of course that the projector P as well as the tape recorder Tm are provided with an earth terminal respectively, and that the synchro box B should be equipped with an earth terminal, but these members are omitted in FIG. 8 for clarity's sake.

The constitution of the synchro box B will now be explained hereinafter provided that electric pressure is partially supplied to said synchro box B from the power source EP of the projector P. The symbol O designates a reference oscillator, CC denotes a control circuit for a drive source of the projector P, RES indicates a set device for exciting the relays by means of the output of the photo-electric transducing element PC which serves to detect the mark in the projector P so as to set the switch Sbc to the reproducing start condition under the after-recording reproduced condition, or to set said switch Sbc to the condition ready for sound recording at the time of sound recording, SbP is a three-position change-over switch, that is, for changing over to a position ready for reproducing, a position ready for recording and an "OFF" position. The aforementioned system start button is divided into two switches SbP and Sbc in the mechanism shown in FIG. 8. When said switch SbP is set to be ready for recording, the switch SA is set to be "On" condition, thus the switch Sbc is set to be changed over to the recording position. The content of the above-mentioned switch SA is understood that said two switches SbP and Sbc are integrated with each other.

Figure 10:
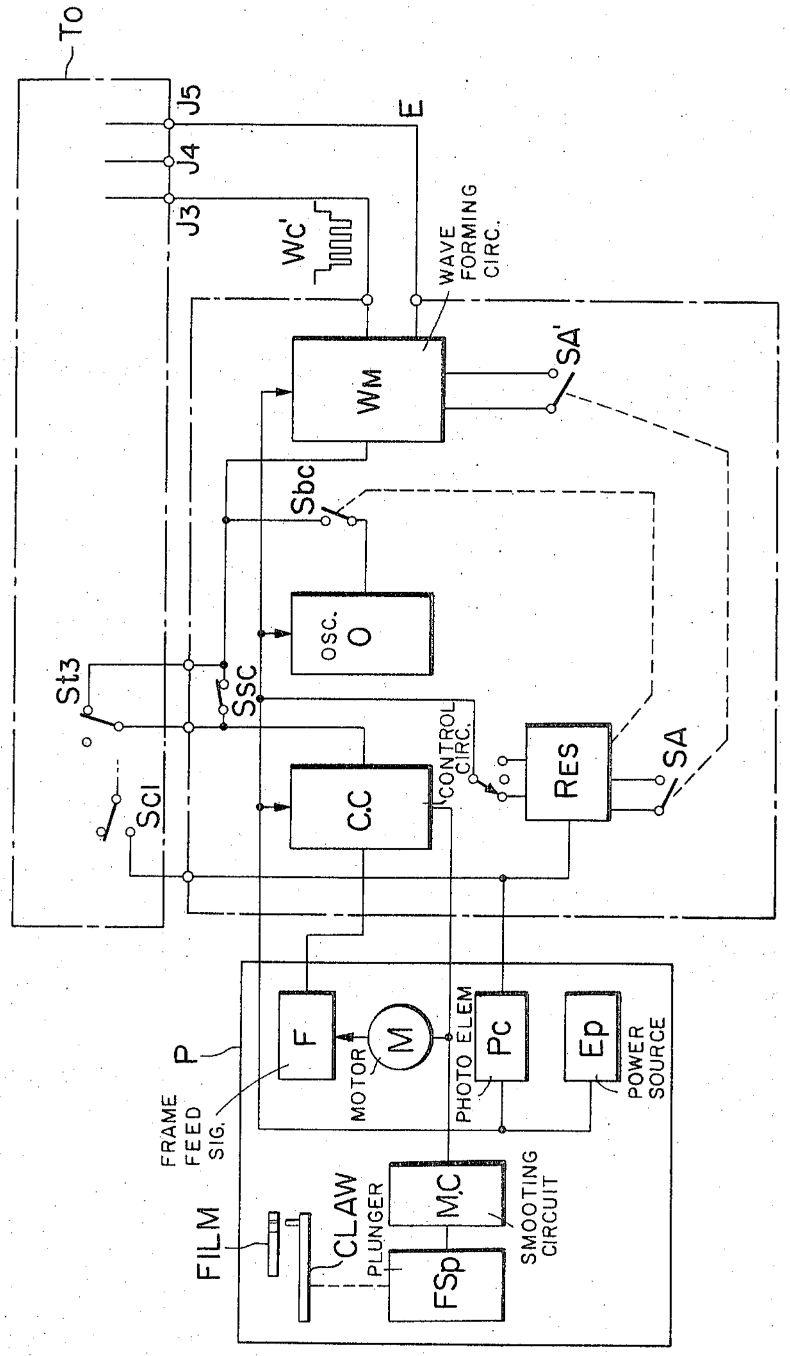
FIG. 10 is a connecting diagram of electric circuits in an another modification shown in FIG. 8, FIGS. 11 and 12 respectively are detailed connecting diagrams of electric circuits showing the principal parts of FIG. 10.

FIG. 10 shows a modified circuit of FIG. 8 which is constructed in such a manner that the synchro box B is added therewithin the wave form composite circuit $W_M$ and two switches Ssc, SA′, or that the projector P is added within the smooth circuit MC and the plunger FSP.

Other reference symbols are identical with those designating the constitutional members in FIG. 8. Therefore these reference symbols are omitted in FIG. 10. Moreover, earth and other members are illustrated as a schematic block diagram, so that they are eliminated in the drawing with exception of those indispensable for explanation.

The connecting diagram of electric circuit shown in the drawing is applicable not only for simultaneous sound recording by arranging the tape recorder To of synchronized recording with the camera C, but also for the after-recording operation by assembling the projector P, the synchro box B and the tape recorder To for synchronized recording through the following modification that the synchro box B is added in said composite circuit $W_M$ and two switches Ssc, SA′ as well as the projector P is added within said smooth circuit MC and the plunger FSP. In this instance, the tape recorder To and the projector P are changed over to "ON" or "OFF" position corresponding to "ON" or "OFF" condition of the switch SA′ interlocking with the switch SA which is housed within the synchro box B, thus resulting in very simple and easy editing and after-recording operation.

Figure 11:
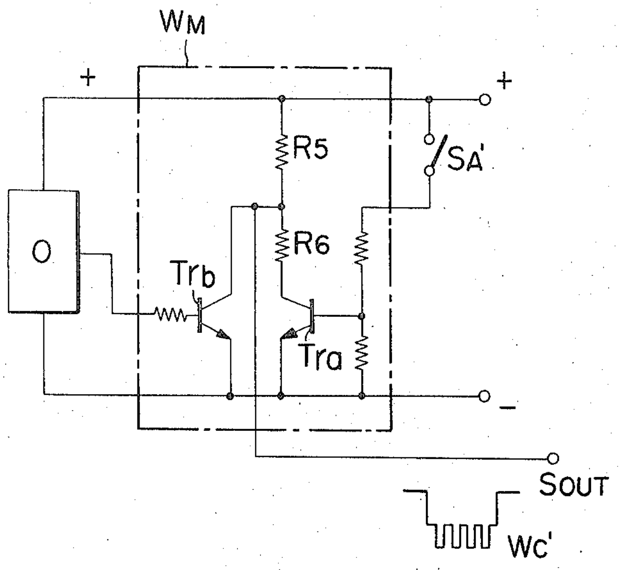

FIG. 11 is a connecting diagram of the wave form rectifying circuit of FIG. 10 showing in a form of an embodiment. The reference symbol Tra, Trb respectively are transistors, $R_5$, $R_6$ respectively are resistance for partial pressure, and SA′ is a switch. When the switch SA′ is changed over to "ON" position, the transistor Tra is converted in "ON" condition, then electric pressure of power source is effected to be partially pressured corresponding to the ratio between the two resistance $R_5$ and $R_6$, and the output is emitted from the output terminal Sout. Subsequently, when pulse signal of pulse from the oscillation O is loaded, said pulse signals are superposed at the output terminal Sout, thus the signal wave form Wc is transformed in the output wave form, the output of which is connected with the connector $J_3$ of the synchro box B.

Figure 12:
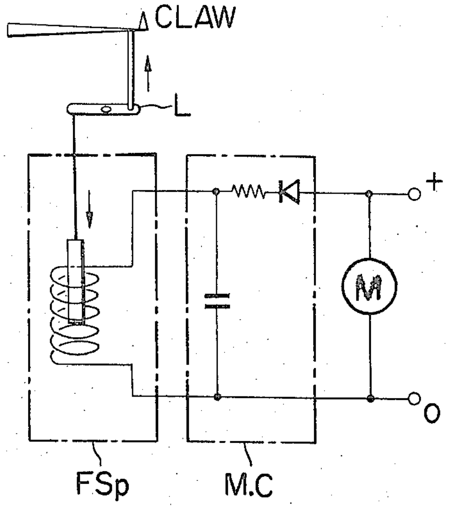

FIG. 12 shows the detail of the smooth circuit MC and the plunger FSP of FIG. 10 in a form of an embodiment.

Electric pressure which is supplied to the projector drive source M to be transformed therein is fed to the plunger FSP through the smooth circuit MC. In other words, when the power source fed to said drive source M is converted into "ON" condition, the plunger FSP is actuated, for instance, due to intake action, the film feeding claw CLAW is pushed outwardly through the lever L, thus the film feeding operation starts its motion. Moreover, when the power source of the drive source M is fed back to be "OFF" condition, said film feeding claw CLAW returns to the initial position, and the film is halted in its movement. Accordingly, delay of the projector P caused by the mechanical inertia in said projector P at the time of halting the drive may be eliminated.

Figure 13:
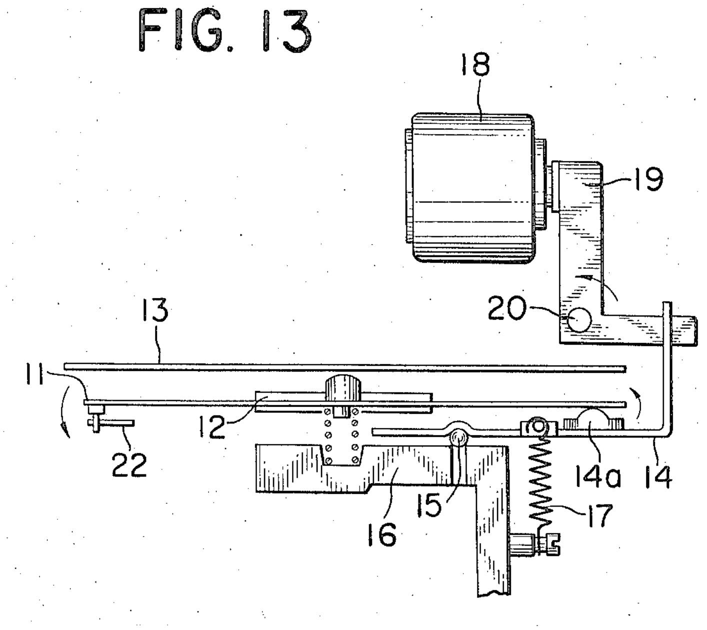
FIG. 13 is a front view of the mechanism shown in FIG. 12.

FIG. 13 shows the plunger and its follower mechanism indicated in FIG. 12 in a form of an embodiment. In the drawing, the reference numeral 11 is a film feeding claw provided in the projector. 12 is a sector blade, 13 is a control cam for said film feeding claw, and 14 is a base plate on which said claw 11 is fixed. Said base plate 14 is fixed to the main body 16 of the projector by means of coil spring 17 through steel ball 15. Functional relation between said feeding claw 11 and the plunger 18 in the foregoing mechanism is such that when the plunger 18 is energized, the interlocking lever 19 is rotated about the fulcrum 20 in a counter clockwise direction so as to turn said base plate 14 around said steel ball 15 in a counter clockwise direction, thus said film feeding claw 11 is pushed upward to the position shown in the drawing by means of a boss **14*a* mounted on said base plate 14 and is adapted to be engageable within the perforation aperture 7 of the film 22. When the plunger 18 is shifted to "OFF" condition, the film feeding claw 11 is rotated around the steel ball in a clockwise direction by resiliency of the coil spring 17, thus said claw 11 is separated far from the engaged position with the film 22.**

The above described movement of the film feeding claw is able to be driven entirely independently of the relative action of said claw 11 and the control cam 13, so that it is very advantageous in the operation for start position setting of the film in case of a synchronized reproducing by connecting the foregoing projector with the tape recorder, and in case of the after-recording, in other words, since the film feeding operation is controlled only by means of the action of the plunger, the drive load for starting or stopping the film feeding motion in a projector as well as the speed step for starting and stopping between a projector and a tape recorder caused by inertia can respectively be eliminated.

According to the mechanism shown in FIGS. 12 and 13, the projector P, the synchro box B and the tape recorder To are interconnected with one another, and when said tape recorder To is set to be ready for sound recording, and the projector P is mounted on a roll provided therewithin for feeding the film, the mark recorded on the film is detected by a photo-electric transducing element PC and the film is set by the setting device RES, thereby the switch Sbc is changed over to "OFF" position to stop the drive of the projector P so that the start position setting of film is able to be effected accurately. Subsequently, upon setting the switch SA to "ON" condition, the switch SA' is changed over to "ON" position and the wave form signal Wc' is fed to the tape recorder To through the connector $J_3$, thereby said tape recorder To is energized to start for sound recording. At the same time, pulse signal is transmitted to the control circuit CC, and said projector P starts its operative motion instantaneously under the foregoing mechanism. Upon setting the switch SA to "OFF" condition, the tape recorder To and the projector P respectively are halted instantaneously. The abovementioned function is performed repeatedly to achieve the after-recording operation very easily and simply by punctuating every each scene of a film.

It has not been described on the function for the speed control of the film feeding mechanism provided in the foregoing camera.

Figure 14:
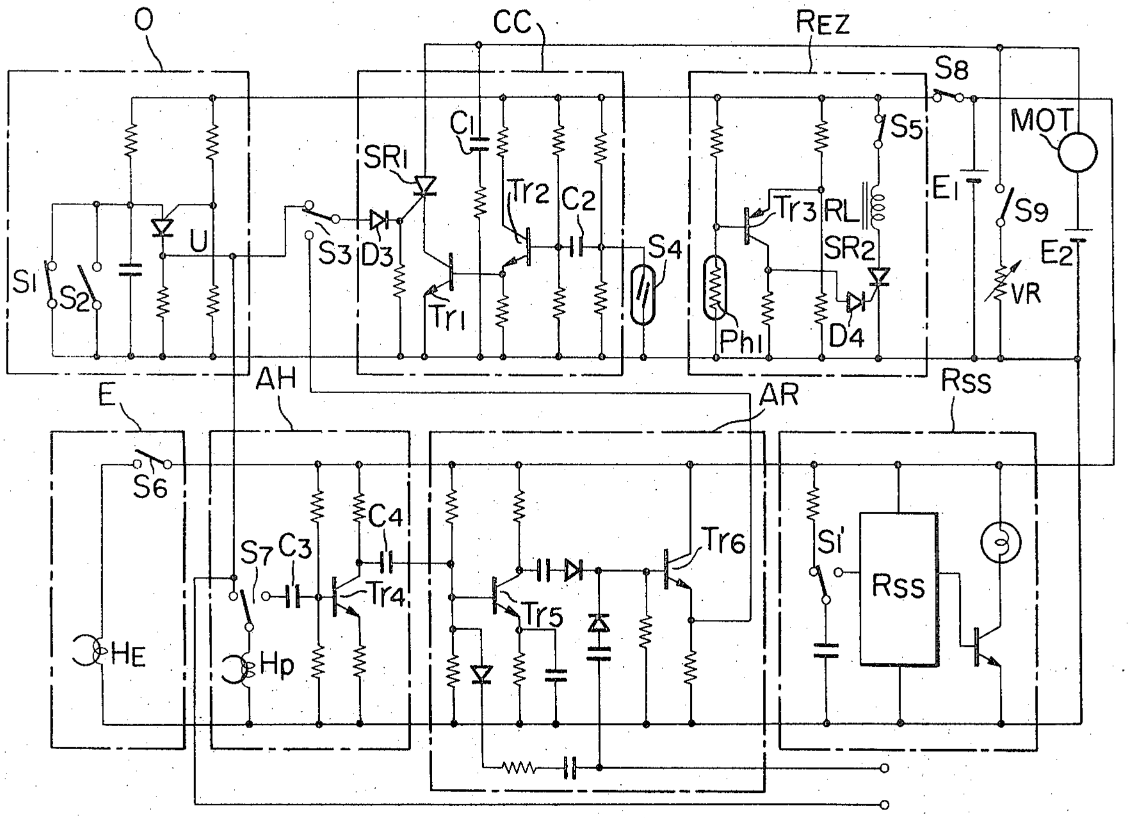
FIG. 14 is a connecting diagram in the system according to the present invention showing a circuit block in a form of still another embodiment, FIGS. 15 – 19 respectively are front views of a tape recorder applicable to the system according to the present invention showing the mechanism thereof for an instantaneous starting and halting actions.

In case, the feeding rate of a film at the portion for simultaneous recording with a camera and the film feeding rate of the after-recording portion are extremely variable to each other. In other words, oscillation pulse from the oscillator $O_9$ in the synchro box B and the frequency of pulse signal corresponding to the film feeding rate of a camera are remarkably different, thus reproducing projection will be unsatisfactory, so that it is quite necessary to control accurately the film feeding rate of a camera. From the aforementioned reason, a control circuit for the film feeding motion of a camera by means of reference pulse train or by signals previously recorded on a tape is shown in FIG. 14. The above-mentioned synchro box B is a control circuit for the drive source M of the projector P and by applying said synchro box B to the drive motor MOT of a camera as a control circuit, it is possible to control the speed of a camera. From the foregoing standpoint of view, FIG. 14 shows a control circuit used together as the synchro box B in a form of an embodiment.

The oscillator O generating reference pulse signals for adjusting the film feeding rate of a camera at a constant speed comprises a uni-junction transistor U, a resistance group, a capacitor and a switch group.

The switch $S_1$ serves for changing over oscillation of the oscillator O to "ON" and "OFF" positions, the switch $S_3$ is a change-over switch for changing over reference oscillation signal of said oscillator O, and signals recorded previously on tape, while $S_2$ represents a switch interlocked with the relay RL.

Control circuit CC is composed of a thyrister $SR_1$, transistors $Tr_1$, $Tr_2$, diode $D_3$, resistance group and two capacitors $C_1$ and $C_2$, and is good for controlling the speed of the film feeding motor MOT, and in this circuit said thyrister $SR_1$ is adapted to be shifted to "ON" position by the input of positive reference pulse signal at the gate of the thyrister $SR_1$, and said pulse signal is transmitted from the oscillator O or magnetic tape. The transistor $Tr_1$ is all the time biased normally by the other transistor $Tr_2$ which is also biased normally to be kept "ON" condition by a bleeder resistor. $S_4$ is a switch, for example, of one-frame and one-pulse prepared at the side of a camera by means of a lead switch and is adapted to detect the speed of the motor MOT. When said switch $S_4$ is "ON" position, transistors $Tr_2$, $Tr_1$ are converted in a second into "OFF" condition by a differentiated minus pulse, thereby the thyristor $SR_1$ is turned off. This circuit supplies to the motor MOT of the camera a plus standard pulse signal train and a rectangular wave current in proportion to the phase difference between individual pulses of a minus pulse signal train in proportion of the camera speed. When the phase difference is large the motor is accelerated and when it is small the motor is decelerated. As the current control system is used, there is no influence by the variation of the power source voltage and also as the speed feed-back type is used there is also no influence by the load variation.

The switches $S_1$ and $S_1'$ are associated with the release signal of the camera, and the control circuit Rss' for the light source of the start mark serves to record the start mark on a predetermined position of the film. Rss' is a circuit for detecting release signals. RES is a circuit for setting the start position, but does not operate in case of photographing. This RES controls the oscillator O and is composed of a transistor Tr3, a thyrister SR2, a relay RL, a photo-cell $Ph_1$, a diode $D_4$, a switch $S_5$ and a group of resistors. The switch $S_5$ which is turned off at the time of reproduction is associated with a switch $S_7$, and the switch $S_6$ is associated with the switch $S_1$. The start signal by the camera release for setting the start mark on the film is detected by the photocell $Ph_1$, and its output is amplified by the transistor $Tr_3$ and supplied to the thyrister $SR_2$ to turn the thyrister on, thereby actuating the relay RL and maintaining the state. By the turn on of the relay RL, the switch $S_2$ becomes on while the oscillator becomes off.

The switch $S_3$ changes the control circuit CC from the O side of the oscillator to the side of the lead amplifier AR. The erasing circuit E is composed of the head $H_E$ which erases the signal of the magnetic tape and a switch $S_6$. The amplifying circuit AH serves to reproduce the standard pulse signals recorded on the tape, and is composed of a recording magnetic head $H_P$, a transistor $Tr_4$, a group of resistors, two condensers $C_3$ and $C_4$ and the switch $S_7$. The head $H_P$ is used as a recording head for recording the standard pulse signal train by the changeover of the switch $S_7$ when the output of the oscillator O or outside signals other than those from the camera are recorded.

Ar is an amplifying circuit for amplifying the signal of the amplifying circuit AH or converting a standard pulse signal train from other recording device into signals suitable for the control circuit CC.

The switches $S_8$ and $S_9$ are associated with each other, and the switch $S_8$ is on and the switch $S_9$ is off when the synchro-driving circuit of the camera is in operation, and the switch $S_8$ is off and the switch $S_9$ is on when the synchrodriving is not effected so that the speed of the motor MOT can be freely selected according to the filming speed by the variable resistor. $E_1$ is a power source of the synchronizing device and $E_2$ is a power source for the camera.

Next, some examples of the tape feeding mechanism used in the present invention will be explained.

For the sake of simplification of the explanation, the description will be made as an improvement of the tape feeding device of a tape-recorder, which can be constitutional element of the synchronization system of the present invention.

The desciptions will be made on the mechanism for instantaneously starting or halting of the tape travelling in a tape-recorder which is actuated by a portable power source such as a dry cell.

Conventionally, in case of types actuated by the lamp wire or a battery, the pinch roller is pressed on or off on the rotating capstan and the braking member or the reel shaft is engaged or disengaged by using one or more large capacity solenoid of plunger type. However, when this conventional mechanism is utilized directly to a portable tape-recorder, a large amount of current is required for driving the planger and is not practically useful. Therefore, in the conventional tape-recorders, the starting and halting is effected by the on and off of the power source of a motor for driving the capstan, but the rising and decaying time is longer due to the inertia of individual members of the tape driving system, and thus this mechanism is not practically used in some applications.

By the following mechanism, necessary operations can be realized by a small amount of current.

Figure 15:
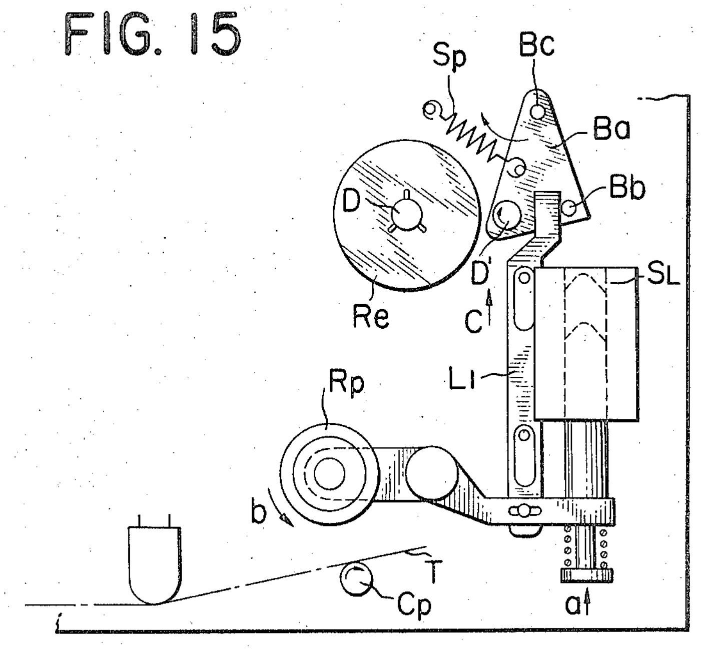

As shown in FIG. 15, in a conventionally known instant-start-stop mechanism, when the planger type solenoid $S_L$ is biased to the direction of *a*, the pinch roller RP is pressed on the rotating capstan C as shown by *b* and the lever $L_1$ is changed in its position in a direction of *c* and disengaged with the stopper Bb on the rotating plate Ba so that the rotating plate Ba is rotated by the spring Sp toward P to slide the driving member D' to the reel Re. Thus the driving force is transferred to the tape winding shaft D and the travelling of the tape is started at once.

Figure 16:
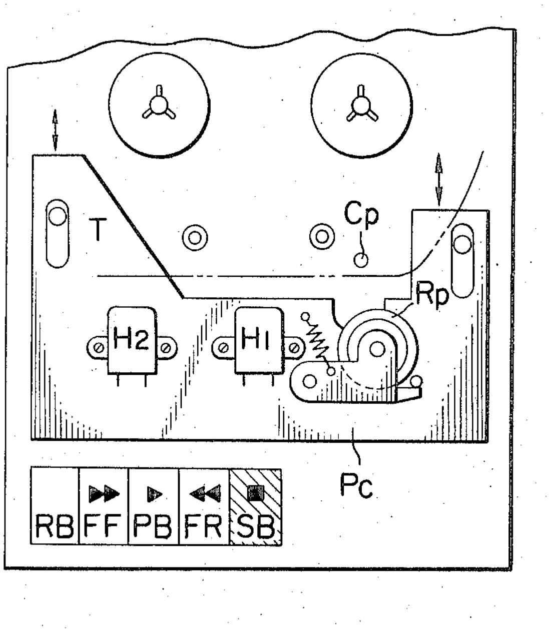

FIG. 16 shows the mechanism of an ordinary cassette recorder. As shown in the drawing, the heads $H_1$, $H_2$ and the pinch roller RP are fixed commonly by a member PC which is movable back and forth, and they are retreated backward at the stop position.

When the play-back button PB is pushed down, the member PC is advanced by a known mechanism so that the power source of the driving motor becomes on and the heads $H_1$, $H_2$ and the pinch roller RP are actuated to start the travelling of the tape T. However, due to the inertia, etc. of the individual members, an instantaneous driving and stopping is practically impossible. In order to realize an instantaneous driving, it is theoretically enough only to effect engagement and disengagement of the driving system as shown in FIG. 15, but in practice a solenoid large in stroke, force and weight is required, and thus this mechanism cannot be used in a portable tape recorder using a dry cell. Then, as shown in FIG. 17*a*, when a small-size actuator A is provided on the common movable member Pc supporting the head $H_1$, $H_2$ and the pinch roller RP, otherwise required stroke can be reduced and it is possible to make the individual members smaller and lighter and obtain improved performance by using a dry cell.

Figure 17A:
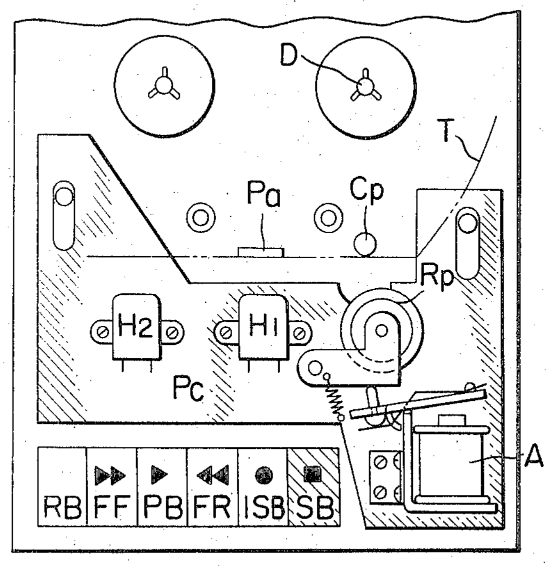
Figure 17B:
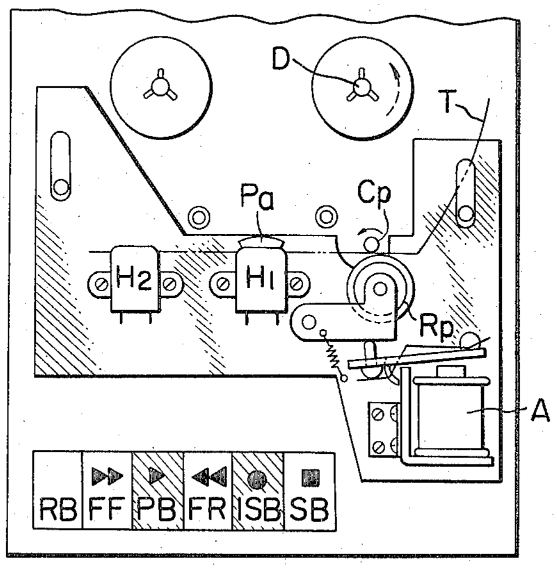

FIG. 17*b* shows the change from the state in FIG. 17*a* in which the stop button SB is set to the state in which the instant stop button ISB and the play-back button PB are set, and the stop button SB is reset when the signal from the tape T is reproduced. The movable member Pc is in an advanced state, and the capstan Cp is kept rotating, and as the tape is held between the pad Pa within the cassette and the head $H_1$, $H_2$, the tape is driven through the slip mechanism. The winding shaft D is rotated as shown by the arrow by the driving motor.

Figure 18:
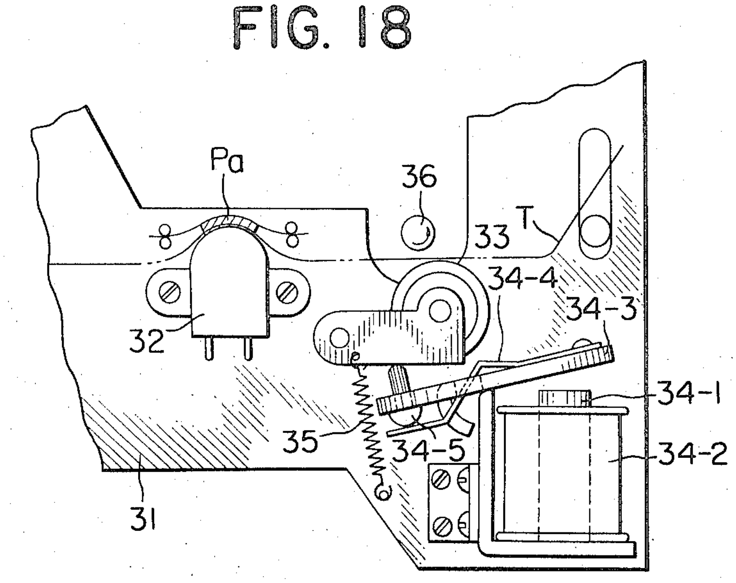
Figure 19:
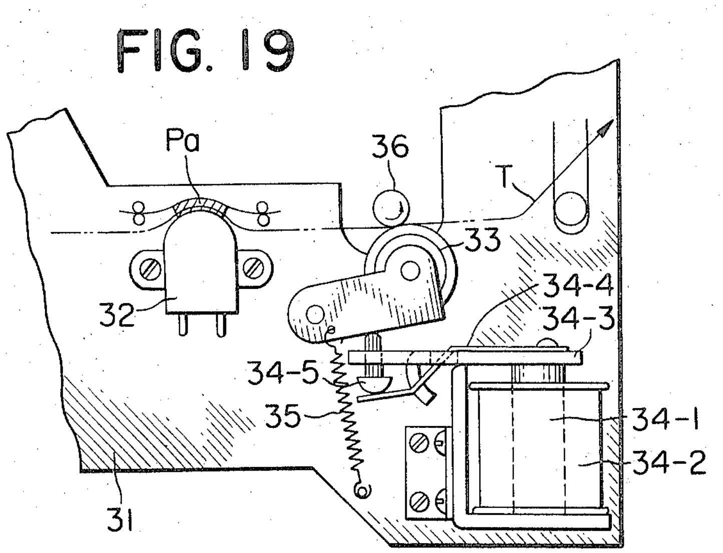

FIG. 18 shows details of one embodiment of the present mechanism. The head 32, the pinch roller 33 and the actuator 34 all fixed on the movable member 31 are in an advanced position, as mentioned above, the pinch roller 33 is disengaged with the capstan 36 by a weak backward spring 35. Then when current is passed to the coil 34-2 coiled on the magnetic core 34-1 of the actuator, the movable plate 34-3 is attracted and strikes against the spring 35 on the rotating capstan 36 through the tape. Under this condition, the tape does not yet start travelling, but the attracting power of the movable plate 34-3 is suddenly increased as the space of the magnetic circuit is narrowed and the tape is attracted as shown in FIG. 19. The control element 34-5 presses with almost constant pressure the pinch roller on the capstan by aid of the pre-spring 34-4 so that the travelling of the tape is started instantaneously. Pa is a pad which presses springly the tape T on the surface of the head 32.

At the time of a synchronized sound recording, the actuator 34 is maintained at the position of FIG. 19 by known various holding mechanisms such as a magnetic relay while the release switch of the camera is pushed down, but it is desirable that the actuator returns instantaneously to the position of FIG. 18 by the cut-off of the holding current or by a reverse current flow.

Figure 20:
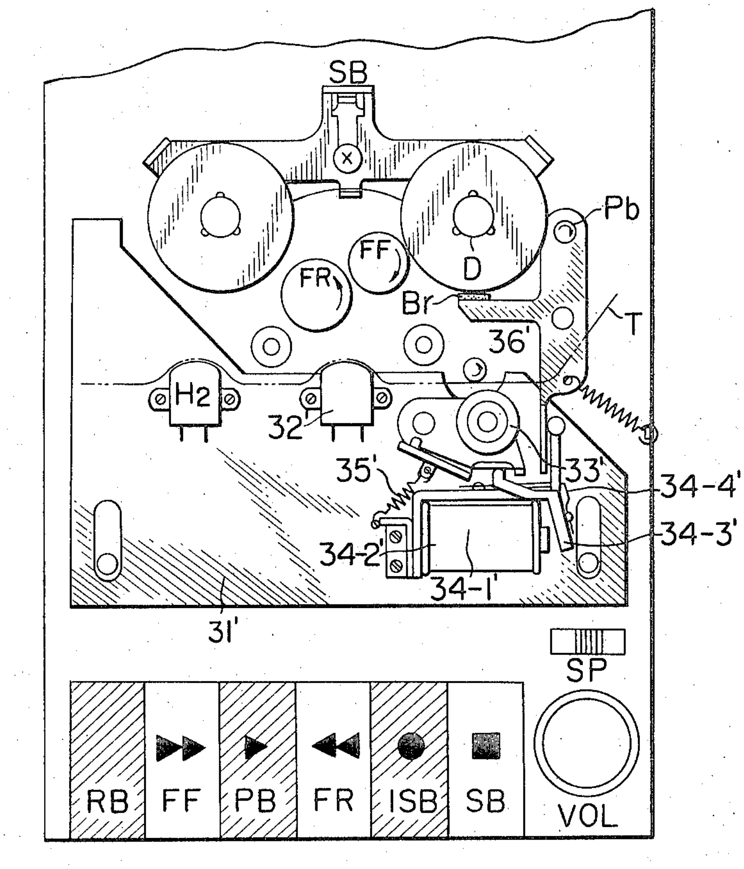
FIG. 20 is a plane view of a tape recorder applicable to the system according to the present invention showing the mechanism thereof in a form of another embodiment and FIG. 21 is a diagram of delay-time shown in FIG. 9.

FIG. 20 shows an embodiment in which engagement and disengagement of the reel shaft D with the winding drive mechanism Pb or association with the braking member Br is made possible by shifting the movement of the movable member 34-3 in a direction perpendicular to the movement of the member 31′, for example. In this case, it is very advantageous if the association of the tape driving power source with the tape driving shaft is effected by supplying the current to a magnetic means prior to the association, and the association is released after the current supplying characteristics to the magnetic means are changed. And in this embodiment, it is very advantageous as the combination or association with the magnetic means can be effected accurately due to the narrowed moving range of the pinch roller 33′, and the mechanism can be used as an ordinary tape recorder or as the synchronizing tape-recorder of the present invention by changing the current supplY.

Although an instantaneous starting and stopping mechanism using two or more magnets can be constructed, the above embodiment uses only one magnet for minimizing the size.

The instantaneous starting and stopping mechanism has been described in somewhat simplicity. In FIG. 20 same members as in FIGS. 18 and 19 are given same numbers with dash marks, and the hatch lined button of the console portion is shown as in a set condition. In practice, the controlling of the console is determined so that the mechanism can be used also as an ordinary tape-recorder.

For example, in case the instantaneous stopping button ISB and the program button SP are not used, the ordinary sound recording is effected by the button RB, the ordinary reproduction is done by the button PB and the stopping is done by the stop button SB. Further, when photographing is taken, if the buttons RB, PB and ISB are set and the button SP is set nonsynchronously, the sound recording is not done by the tape recorder To even when the release button of the camera is pushed down, and in case the synchronization is effected by setting the buttons RB, PB and ISB, the tape recorder To is made to operate instantaneously by setting the button SP in synchronization and pushing down the release button of the camera, and in case when the tape recorder To is instantaneously stopped upon the release of the release button of the camera, the change-over switches $Sc_1$ and $Sc_2$ in FIG. 14 are associated with the button RB, the change-over switch $Sc_3$ is associated with the button PB and the resetting of the switch group by the stop button SB. The program switch is arranged so as to be changeable in corresponding to the instructing signal, and the operation can be simplified by arranging the content of the instruction.

What is claimed is:

1. A system for reproducing an image on a recorded film and at the same time recording sound signal relating to the reproduced image comprising:

an image reproducing device for continuously reproducing a train of image sequences, said reproducing device having film driving means for driving film along a path, mark detecting means along the path and having a photo-electrical light receiving device for photo-electrically detecting start marks selectively provided on the film at the start of each image sequence, said film driving means having synchronization means for receiving an external synchronizing signal and means coupled to the synchronization means for feeding the film one frame at a time in synchronism with the external synchronizing signal;

a sound reproducing device for sensing sound on a medium recorded with a sound sequence signal corresponding to the image sequence and reproducing the recorded sound, said sound reproducing device comprising a driving means for driving the sound medium along a course, control signal detecting means along the course for electrically detecting a synchronization signal recorded with each sound sequence of the sound medium and stop signals recorded in correspondence to the end of each sequence;

a sound recording device electrically connected with the sound reproducing device and recording the sound signal from the sound reproducing device on a second sound recording medium and also selectively recording another sound signal on the sound recording medium, said sound recording device having a synchronous driving means which receives the external synchronizing signal and runs in correspondence to the image sequence;

a synchronization indicator producing means for independently generating a continuous synchronization indication;

selective coupling means for applying the synchronizing signal to the image reproducing device and the sound recording device and drive the both devices by the synchronizing signal, said selective coupling means electrically connecting the control signal detecting means and the mark detecting means of the image producing device and the synchronization indicator producing means to the sound recording device automatically.

2. The system according to claim 1 in which the selective coupling means comprises a descriminating means having a frequency discrimination filter, said stop signal and the synchronization signal are signals having different frequences recorded on the same track of the sound medium.

3. The system according to claim 2 in which the sound reproducing device further comprises means for recording sound medium control signal, said means having;

a first switching circuit having a constant threshold value, change-over means connecting the output of the circuit to the sound medium driving means and causing the driving means to operate;

recording means for recording the control synchronizing signal onto the sound medium;

independent synchronous signal generating means, said control means being connected electrically between the second switching circuit, the synchronous signal generating means and the recording means to record selectively the output signal of the switching circuit of the output signal of the synchronous signal generating means.

4. The system according to claim 3 in which the inputs of the first and second Switching circuits receive the start mark signal of the camera side and the film feeding signal of the camera side, and have different levels and are non-sensitive to the start mark signal.

5. The system according to claim 3 in which the recording means further comprises a delay circuit connected between the first switching means and the change-over means, which delay circuit delays the start of the sound medium driving means by a constant time.

6. The system according to claim 1 in which the selective coupling means is restored by the control signal detecting means, and electrically connects the synchronization indicating producing means, the synchronizing signal of the image reproducing device and the synchronous driving means of the sound recording device and drives them by the synchronizing signal.

7. The system according to claim 1 in which the sound reproducing device is a magnetic tape reproducing device using a magnetic tape medium as the sound medium, said device further comprising tape driving means having a capstan driven at a constant speed, a pinch roller movably provided between the first position at which the tape is held between the capstan and the roller and the second position for moving the tape back, and a magnetic means connected with the pinch roller and electrically connected with the output of the control signal detecting means and the output of the mark detecting means thus driving the magnetic means from the second position to the first position by the output of the mark detecting means and driving the magnetic means from the second position to the first position by the output of the control signal detecting means.

8. The system according to claim 1 in which and the selective control means forms the synchronizing signal and is composed of a control box contained in the same case, and the box, the image reproducing device, the sound reproducing device and the sound recording device are connected electrically through a lead wire.

9. The system according to claim 8 in which the sound recording device has a reproducing means for reproducing the control signal on the recorded sound medium, the image reproducing device further comprising pulse generating means for generating a control signal synchronous to each frame of the film to be fed, and the control box further comprises a comparator circuit connected to the reproducing means at its input and connected to the pulse generating means at its comparating input, a drive control circuit connected to the output of the comparator circuit and increased or reduced in its driving output by the output of the comparator circuit, the output of the control circuit being connected to a power supply circuit of the film driving source of the image reproducing device.

10. The system according to claim 7 in which the film driving system has a film feeding motor, and reciprocating means for feeding film frames, said means has a magnetic means, changes over operation and non-operation of the film frame feeding, and the magnetic means is connected with the output of the driving control circuit.

11. The system according to claim 1 in which the selective control means further comprises first switching circuit means the output of which is connected with the magnetic means and a holding circuit element of the magnetic means, a second switching circuit means the output of which is connected electrically with the image reproducing device and the synchronization indication producing means and has a threshhold level different from that of the first switching circuit means, and the output of the control signal detecting means being applied to the first and second switching circuit means.

* * * * *